(12) United States Patent
Schwed et al.

(10) Patent No.: US 11,151,283 B2
(45) Date of Patent: Oct. 19, 2021

(54) SECURE DATA ANALYSIS IN MULTITENANT APPLICATIONS

(71) Applicant: SAP SE, Walldorf (DE)

(72) Inventors: Konstantin Schwed, Bad Schoenborn (DE); Sergey Smirnov, Heidelberg (DE)

(73) Assignee: SAP SE, Walldorf (DE)

(*) Notice: Subject to any disclaimer, the term of this patent is extended or adjusted under 35 U.S.C. 154(b) by 739 days.

(21) Appl. No.: 15/706,544

(22) Filed: Sep. 15, 2017

(65) Prior Publication Data

US 2019/0087835 A1 Mar. 21, 2019

(51) Int. Cl.
| | |
|---|---|
| *G06F 21/62* | (2013.01) |
| *H04L 12/26* | (2006.01) |
| *G06F 9/54* | (2006.01) |
| *G06F 17/17* | (2006.01) |
| *G06F 9/50* | (2006.01) |
| *G06Q 30/02* | (2012.01) |
| *G06F 3/0481* | (2013.01) |
| *G06F 16/248* | (2019.01) |

(52) U.S. Cl.
CPC ............ *G06F 21/6254* (2013.01); *G06F 9/50* (2013.01); *G06F 9/54* (2013.01); *G06F 21/6218* (2013.01); *G06F 21/6227* (2013.01); *H04L 43/04* (2013.01); *G06F 3/0481* (2013.01); *G06F 16/248* (2019.01); *G06F 17/175* (2013.01); *G06Q 30/0201* (2013.01)

(58) Field of Classification Search
CPC ............ G06Q 30/0201; H04L 63/0421; H04L 63/0414; G06F 21/6254
See application file for complete search history.

(56) References Cited

U.S. PATENT DOCUMENTS

| | | |
|---|---|---|
| 8,819,210 B2 | 8/2014 | Tammam |
| 9,043,458 B2 | 5/2015 | Balaji et al. |
| 9,509,782 B2 | 11/2016 | Lawson et al. |
| 9,619,669 B2 | 4/2017 | LaFever et al. |

(Continued)

OTHER PUBLICATIONS

Choudhary, "Multi-Tenancy in the Cloud: The Power, Perks and Pitfalls," available at: https://blogs.sap.com/2013/10/31/multi-tenancy-in-the-cloud-the-power-perks-and-pitfalls/, 5 pages, (Oct. 31, 2013).

(Continued)

*Primary Examiner* — Lewis A Bullock, Jr.
*Assistant Examiner* — Melissa A Headly
(74) *Attorney, Agent, or Firm* — Klarquist Sparkman, LLP

(57) ABSTRACT

According to a disclosed embodiment, data analysis is secured with a microservice architecture and data anonymization in a multitenant application. Tenant data is received by a first microservice in a multitenant application. The tenant data is isolated from other tenant data in the first microservice and stored separately from other tenant data in a tenant database. The tenant data is anonymized in the first microservice and thereafter provided to a second microservice. The second microservice stores the anonymized tenant data in an analytics database. The second microservice, upon request, analyzes anonymized tenant data from a plurality of tenants from the analytics database and provides an analytics result to the first microservice.

16 Claims, 23 Drawing Sheets

(56) References Cited

U.S. PATENT DOCUMENTS

| | | | |
|---|---|---|---|
| 2013/0275803 A1* | 10/2013 | Kern | G06Q 10/063112 |
| | | | 714/15 |
| 2014/0280261 A1* | 9/2014 | Butler | G06F 21/6254 |
| | | | 707/756 |
| 2016/0269425 A1 | 9/2016 | Shieh et al. | |
| 2016/0381025 A1 | 12/2016 | Foerster et al. | |
| 2018/0034924 A1* | 2/2018 | Horwood | H04L 67/40 |
| 2018/0096165 A1* | 4/2018 | Warshavsky | G06F 21/6245 |
| 2019/0068622 A1* | 2/2019 | Lin | G06F 21/552 |

OTHER PUBLICATIONS

Eyers et al., "Integrating Process-Oriented and Event-Based Systems," *Dagstuhl Reports*, 6:21-64 (2017).

Lewis and Fowler, "Microservices: a definition of this new architectural term," available at: https://martinfowler.com/articles/microservices.html, 15 pages (Mar. 25, 2014).

"Microservices," Wikipedia, available at: https://en.wikipedia.org/wiki/Microservices, 8 pages, retrieved on or before Sep. 15, 2017.

"Panel data," Wikipedia, available at: https://en.wikipedia.org/wiki/Panel_data, 4 pages, retrieved on or before Sep. 15, 2017.

"Service-oriented architecture," Wikipedia, available at: https://en.wikipedia.org/wiki/Service-oriented_architecture, 4 pages, retrieved on or before Sep. 15, 2017.

"What is Microservices Architecture?" SMARTBEAR, available at: https://smartbear.com/learn/api-design/what-are-microservices/, 9 pages, retrieved on or before Sep. 15, 2017.

\* cited by examiner

SECURE DATA ANALYSIS IN MULTITENANT APPLICATIONS

FIELD

The present disclosure generally relates to multitenant software applications that can provide enhanced security data analysis. Particular implementations include a microservice architecture coupled with data anonymization.

BACKGROUND

Modern enterprise software applications are increasingly designed as cloud applications. A benefit of a cloud application is the reduction of costs. In some cases, a cloud architecture can allow users to share resources to reduce costs. Resource sharing implies that a cloud application manipulates data of several users. However, in most business scenarios, at least some user data is sensitive—companies do not want to expose it to third parties.

To address this challenge, cloud application providers leverage different means to help provide data privacy. A typical solution is storing data of each customer in a dedicated database schema. However, in some business scenarios, it is not possible to split the data of several customers without negatively impacting application performance, such as the quality of data analysis. Some examples are intelligent applications that make use of machine learning methods to analyze data. Machine learning typically requires large amounts of data to be available. In this context, collecting and analyzing the data of several customers is particularly useful to improve the quality of analysis, but cannot always be done because of the aforementioned data privacy concerns. Therefore, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for secure data analysis in a multitenant environment using a microservice architecture. According to one method, a first microservice receives tenant data for a tenant, where the first microservice is capable of receiving tenant data from a plurality of tenants. The first microservice stores the tenant data in a first database, which stores data from only that tenant. The first microservice anonymizes the tenant data, which helps protect identifying information in the tenant data. The first microservice sends the anonymized tenant data to a second microservice, which stores the anonymized tenant data in a second database, which stores data sent to the second microservice from a plurality of tenants. The second microservice analyzes anonymized tenant data of the plurality of tenants stored in the second database to generate a result. The second microservice sends the result to the first microservice.

According to another method, a first microservice receives first tenant data for a first tenant, where the first microservice is capable of receiving tenant data from a plurality of tenants. The first microservice stores the first tenant data in a first database, which stores data only from the first tenant and is only accessible by the first microservice. The first microservice sends the first tenant data to a second microservice. The second microservice anonymizes the first tenant data, which includes replacing identifying information in the first tenant data with a generated alias. The second microservice stores the anonymized first tenant data in a second database, which stores tenant data from the plurality of tenants sent to the second microservice and is only accessible by the second microservice. The second microservice analyzes anonymized tenant data of the plurality of tenants to generate a result, which is based on the analysis of the anonymized tenant data for the first tenant and anonymized tenant data for other tenants of the plurality of tenants stored in the second database. The second microservice sends the result to the first microservice.

In a further method, a first microservice receives tenant data for a first tenant, where the first microservice is capable of receiving tenant data from a plurality of tenants, and the first tenant data has one or more profiles representing respective distinct entities. The first microservice stores the first tenant data by profile in a first database, which only stores data from the first tenant and is only accessible by the first microservice. The first microservice anonymizes the first tenant data, which includes protecting identifying information of the entities in the one or more profiles. The first microservice sends the anonymized first tenant data to a second microservice and prevents sending first tenant data that is not anonymized. The first microservice also sends a sharing indicator for the first tenant to the second microservice. The second microservice stores the anonymized first tenant data by profile in a second database, which stores tenant data from the plurality of tenants sent to the second microservice and is only accessible by the second microservice. Responsive to the sharing indicator, the second microservice analyzes at least the anonymized first tenant data to generate a result, where, if the sharing indicator indicates no data sharing, the result is generated based on one or more profiles of anonymized tenant data for the first tenant only and, if the sharing indicator indicates data sharing, the result is generated based one or more profiles of anonymized first tenant data and tenant data for other tenants of the plurality of tenants having sharing indicators that indicate data sharing. The second microservice sends the result to the first microservice.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Figure 1A:
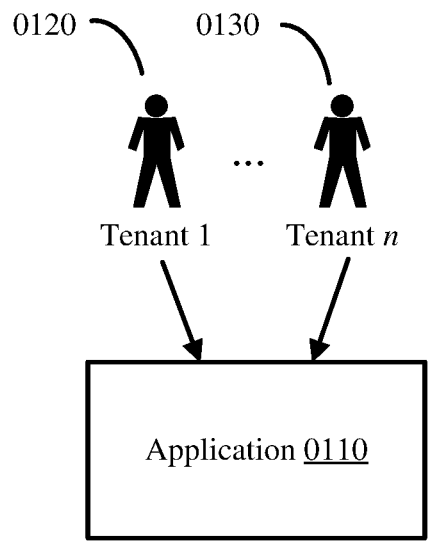
FIG. 1A is a diagram illustrating a multitenant application with a plurality of tenants.

Panel data analysis is valuable in business and research as a predictive tool, in a variety of fields such as human resources, credit scoring, and targeted marketing. It is typically most effective with large amounts of data, and sharing or pooling panel data can be an effective means of obtaining an appropriately large amount of data for effective panel data analysis. However, sharing panel data may expose sensitive information within the data, as panel data is typically correlated with an entity. In some scenarios, the correlation is necessary to enable the analysis. A correlation mechanism often relies on an entity attribute that uniquely identifies the entity. Examples of such attributes are personal identifiers, such as a person's full name or a social security number. Similarly, an organization can be identified by its name, tax ID, or other identifier. While identifiers are used for correlation within panel data analysis, they can reveal sensitive data.

The disclosed technologies enable data analysis, and particularly panel data analysis, using data shared from a plurality of sources, while protecting sensitive data in multitenant cloud applications. Data analysis that protects sensitive data may be called secure data analysis. Such secure data analysis may prevent sensitive data from being accessed, or reduce the likelihood that sensitive data is accessed by making the sensitive data hidden or less accessible through heightened security. This can be accomplished through two components, which can be used alone or in combination, and can be used with other features to help enhance data security. First, an architectural design utilizing microservices is defined that reduces the security risk. The design leverages a microservice architecture style, an approach to developing a single application as a suite of small services, each running in its own process and communicating with lightweight mechanisms. Specifically, the multitenant application is composed from microservices, whose responsibilities are defined in a way that facilitates secure data processing. Second, an anonymization mechanism omits at least certain sensitive data, or omits information that is not needed for analysis, from the analysis such that, particularly in conjunction with the microservice architecture, panel data can be securely analyzed. Although the present disclosure specifically discloses using microservices and anonymized data, it should be appreciated that the disclosed technologies can be used for processing other types of sensitive data in a multitenant environment.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Multitenant Application

Multitenancy in software is the functionality for a single instance of a software application to service multiple tenants. A software application with multitenancy functionality may be known as a multitenant application. A multitenant application may be an enterprise software application. A multitenant software application may be designed and implemented as a cloud application. The multitenant application may manipulate or use data of several different tenants of the application. FIG. 1A illustrates a multitenant application 0110, having tenants Tenant 1 0120 through Tenant n 0130.

A tenant of a multitenant application may be a customer of an entity providing the software application. A tenant may be a business, an individual, or some other entity. Within the multitenant application, a tenant may be represented with a tenant ID, such as a unique number assigned to the tenant. For example, tenants of a multitenant application may be stored in a database table with a row ID corresponding to a tenant ID, each row representing one tenant, and the further columns of the table representing characteristics of tenants, such as the tenant's name.

Figure 1B:
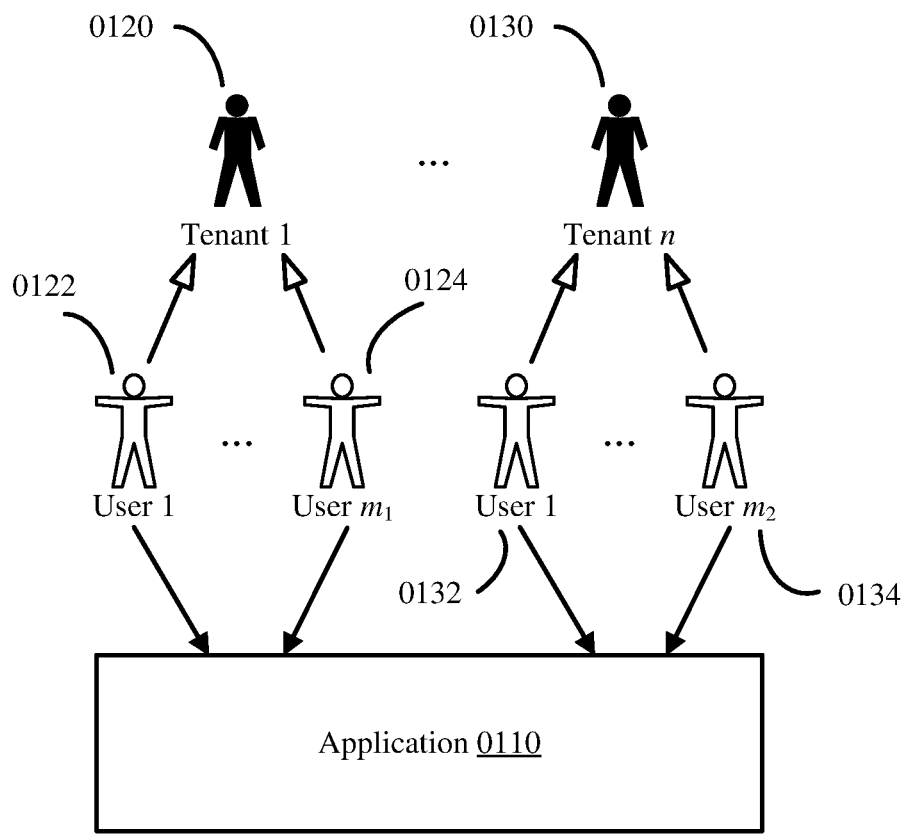
FIG. 1B is a diagram illustrating a multitenant application with a plurality of tenants, with each tenant having a separate plurality of users.

A tenant 0120 may have a user 0122, or have multiple users User 1 0122 through User $m_1$ 0124, of the multitenant application, as illustrated in FIG. 1B. A separate tenant Tenant n 0130 may have a separate user 0132, or have a separate set of multiple users User 1 0132 through User m 0134. The users may be individuals or separate log-ins, which could be shared by a group of individuals. A user may also be a computer system, utilizing a log-in to access the multitenant application. A multitenant application may be accessed by multiple tenants of the application, or by multiple users of a tenant of the application, or by multiple users of multiple tenants of the application, as illustrated in FIG. 1B. Such access may be concurrent—multiple users of multiple tenants may access the software simultaneously.

Example 2—Data in a Multitenant Application

Figure 2A:
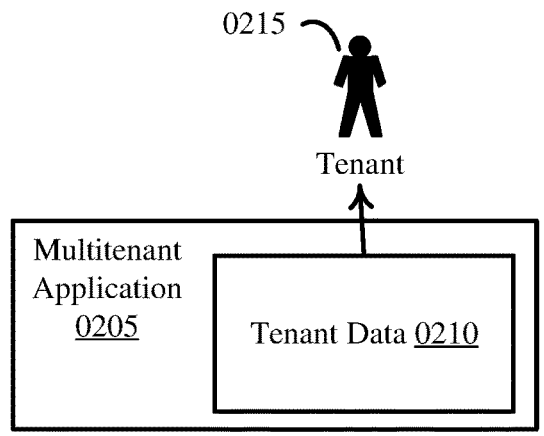
FIG. 2A is a diagram depicting a tenant having tenant data.

Data in a multitenant application may be specific to a particular tenant, making it tenant data as illustrated in FIG. 2A. A multitenant application 0205 may have tenant data 0210 for some or all of its tenants 0215. The multitenant application 0205 may also have data that is not tenant data 0210, such as operational data, configuration data, or testing data. In some instances, tenants 0215 may prefer to maintain their respective tenant data separate from the tenant data 0210 of other tenants. In other instances, tenants may find it valuable to share their respective tenant data 0210, or to commingle their tenant data. In some instances, the association between a tenant 0215 and its tenant data 0210 is not maintained once the tenant data is shared or commingled. In other instances, the association between a tenant 0215 and its tenant data 0210 is maintained when the tenant data is shared or commingled, such that the tenant data can still be identified as coming from a particular tenant even though it is shared or commingled.

Figure 2B:
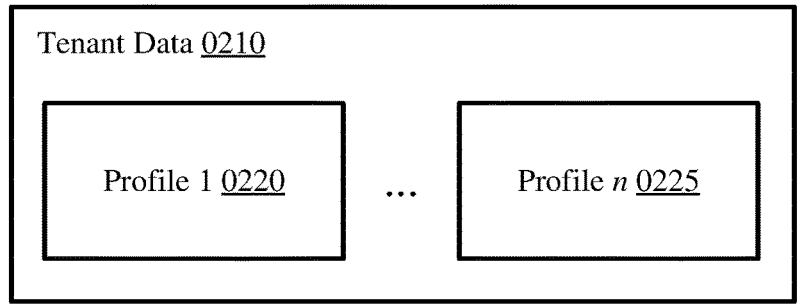
FIG. 2B is a diagram depicting tenant data having profiles.

In one embodiment, tenant data 0210 may include one or more profiles 0220 through 0225, as illustrated in FIG. 2B. A profile, such as Profile 1 0220 through Profile n 0225, includes data that represents or is associated with a particular entity, such as a specific person. A profile 0220 through 0225 may also represent a particular type or category of entities, such as a profile for small businesses, or a particular group of entities, such as a business unit or team of people. In one embodiment, a profile 0220 through 0225 represents an employee of the tenant 0215. Tenant data 0210 may also include data separate from profiles, such as tenant type or a version of an application the tenant 0215 uses.

Figure 2C:
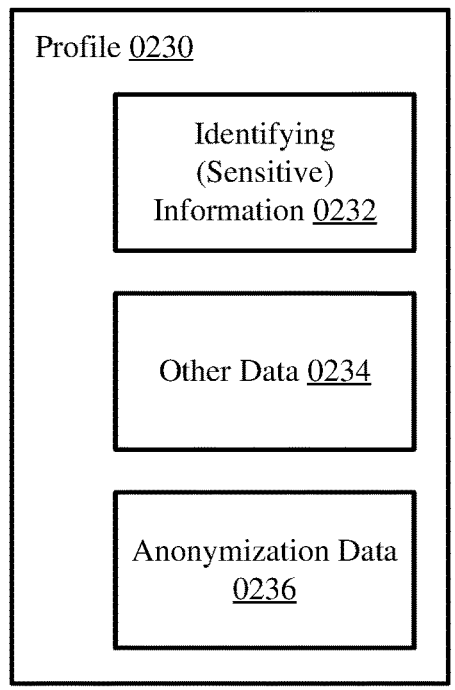
FIG. 2C is a diagram depicting a profile having further sets of data.

A profile 0230 as illustrated in FIG. 2C is a representation of Profile 1 0220 through Profile n 0225 shown in FIG. 2B. A profile 0230 may include identifying (sensitive) information 0232, anonymization data 0236, and other data 0234, as illustrated in FIG. 2C. Identifying information 0232 is data that uniquely identifies the entity the profile represents, and hence may be considered to be sensitive data. This information is also called personally identifying information (PII). The identifying information 0232 may be identifying by a single datum or by multiple aggregated data. For example, the identifying information may be the social security number (SSN) of an employee the profile represents; it may alternatively be the name and date of birth of the employee the profile represents. The identifying information 0232 may include a mix of single identifying data (one or more singularly identifying datum) and aggregated identifying data (one or more groups of aggregated identifying data).

Figure 10:
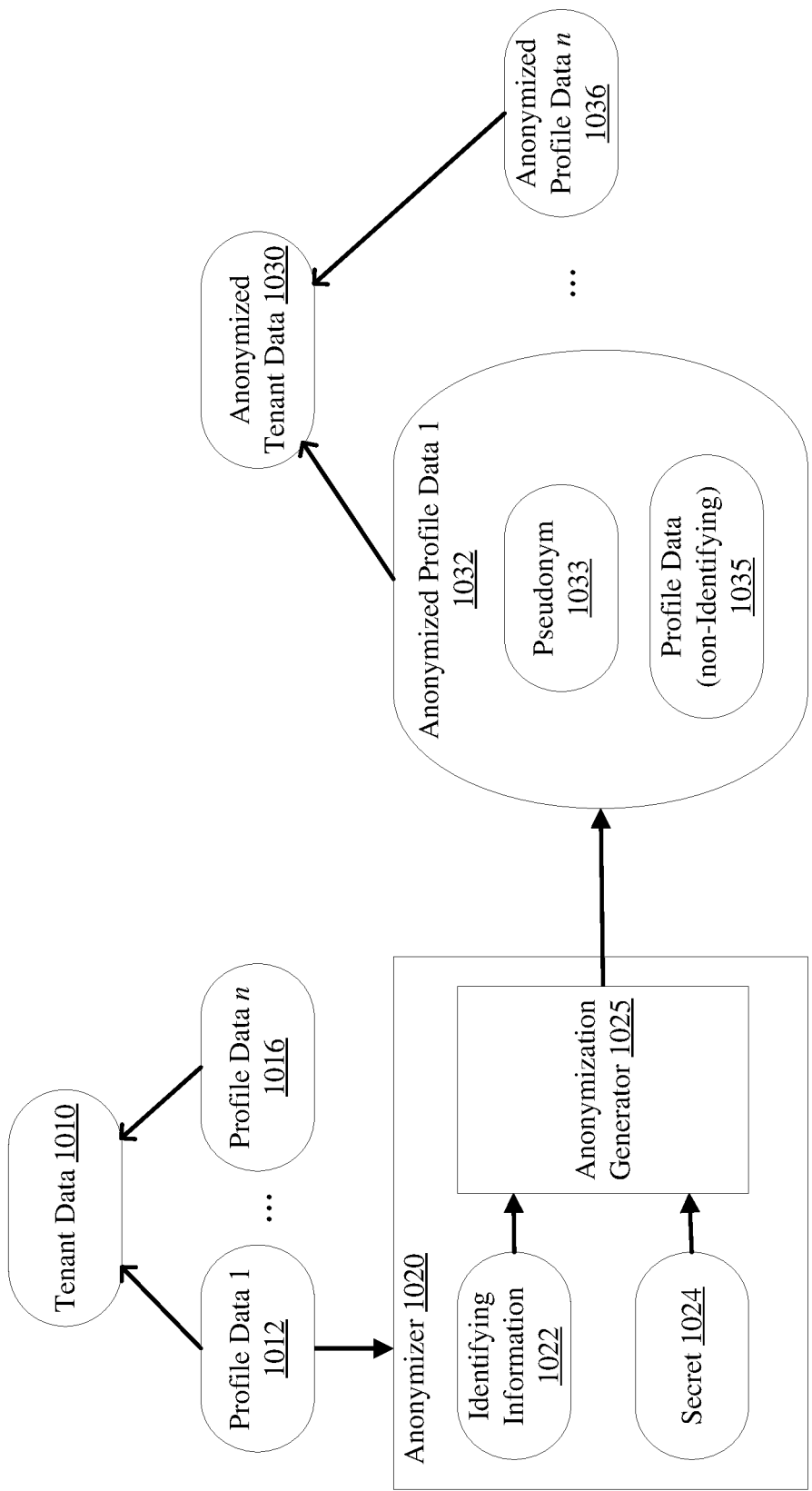
FIG. 10 is a diagram depicting tenant data passing through an anonymizer to become anonymized tenant data.

The anonymization data 0236 includes data that identifies a particular profile 0230 without identifying the actual entity the profile represents. For example, the anonymization data 0236 may be a pseudonym for the profile 0230. The anonymization data 0236 may be used in place of the identifying information 0232 to uniquely identify the profile without disclosing the identity of the entity the profile 0230 represents. The anonymization data 0236 may be generated based on the identifying information, as shown in FIG. 10 (described in Example 12—Anonymizer and Anonymization).

The other data 0234 is data associated with that particular profile 0230 and, at least in some aspects, can be subjected to analysis, including, in specific examples, when pooled with data from other profiles 0230. In one embodiment, the other data 0234 includes panel data. Panel data is data that describes the behavior of an entity over time; in this embodiment, the panel data describes the entity the profile 0230 represents. The panel data may include a plurality of variables measured over time for the entity the profile represents.

The panel data may be balanced or unbalanced between the profiles within the tenant data 0210. The panel data may also be balanced or unbalanced between the tenant data 0210 of different tenants 0215. Panel data is balanced when a plurality of variables are observed across the same time units or intervals across the sets of data (such as profiles within a single tenant's 0215 tenant data 0210, or tenant data across multiple tenants); otherwise, the panel data is unbalanced between the sets. Panel data may be in long format, where one row holds one observation of all variables per time unit or interval, or it may be in wide format, where one row represents one variable for all time units or intervals. Long format is typically formatted by time as the primary key; wide format is typically formatted by variable as the primary key. Anonymization data 0236 may be used to correlate the panel data in the other data 0234 to a particular, but anonymized, profile 0230 during data analysis, in place of the identifying information 0232.

Example 3—Microservices

Figure 3A:
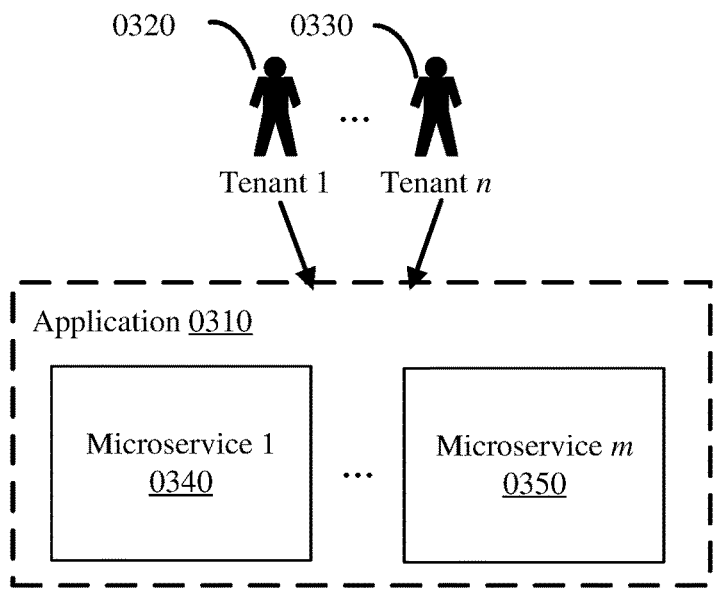
FIG. 3A is a diagram illustrating a multitenant application, with a plurality of tenants, using a microservice architecture.

A multitenant application 0310, accessible by tenants 0320 through 0330, may be developed using a microservice architecture (MSA). An MSA divides a software application 0310 into a collection of independent modular services, known as microservices 0340 through 0350, as illustrated in FIG. 3A. Each microservice 0340 through 0350 is a single software artifact, the collection of which forms a software application as a whole. A microservice provides a portion of the total functionality of the software application 0310, and may be a specific service, such as a business, logical, or programmatic service. Generally, the functionality provided by a microservice is useful in the context of a larger application 0310, but is not independently useful outside the context of a larger application (i.e. a complete collection of microservices, or a sufficient number of microservices that, combined with application-specific code provide application functionality). In some scenarios, a microservice may be shared with another application, depending on the type of functionality and interface provided, and design and architectural needs of the two applications and deployment system.

A software application 0310 may be composed from fine-grained microservices 0340 through 0350 by making some or all of the microservices provide a narrow and/or focused portion of functionality. Each microservice 0340 through 0350 may encapsulate and provide a particular set of functionality provided by the application 0310. The smaller the set of functionality provided by a microservice, or the more narrow-ranging the set of functionality provided, the finer-grained it is; the larger the set of functionality, or the more wide-ranging the set of functionality, the coarser-grained it is.

As a single software artifact, each microservice 0340 through 0350 runs as an independent executable. Thus, each microservice 0340 through 0350 may be designed, developed, tested, deployed, and maintained independently of other microservices; microservices are independently replaceable and upgradeable. This can allow for increased flexibility for each microservice in all these areas, which can shorten development timelines, reduce costs, and limit the effect of errors or bugs. In particular, microservices allow for independent deployment of each microservice, which can be a significant gain over standard enterprise applications. Specifically, microservices may be deployed separately from each other; microservices may also be deployed separate from each other.

In a standard enterprise application, a change to a single piece of functionality can result in complete recompilation, testing, and redeployment of the entire application, which can require large amounts of time and cost, including down time of the application. With software application 0310 using an MSA, a single change is usually limited to a single microservice, thus limiting development, testing, and redeployment to that single microservice, rather than the entire application. This can save time and resources. Further, depending on the microservice, the software application 0310 may not experience down time, or experience reduced down time or only partial functionality down time, as a microservice can be redeployed without affecting the other microservices (interface changes to one or more microservices can be an exception), meaning the other microservices need not be brought down or redeployed. Thus, the multitenant application 0310 is a set of interconnected microservices 0340 through 0350, each running independently and providing discrete functionality that, when put together, forms the multitenant application 0310. MSAs may also be used to implement a software layer, rather than an entire software application. In this way, MSAs can be transparent to systems or users outside of its architecture.

Figure 3B:
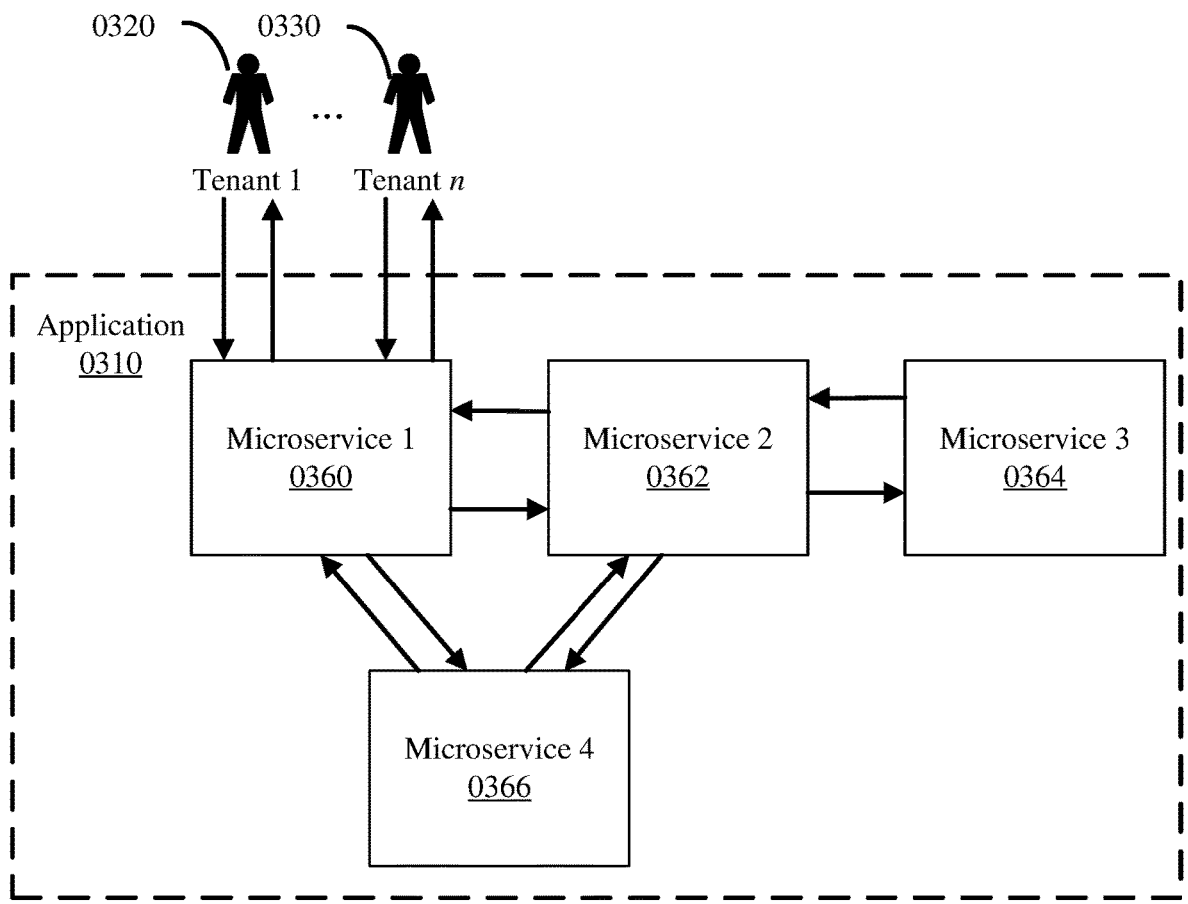
FIG. 3B is a diagram illustrating a multitenant application, with a plurality of tenants, using a microservice architecture and showing communication between the microservices and tenants.

In MSAs, microservices 0340 through 0350 are coupled together using a communication protocol. The microservices may be loosely coupled. The communication protocol may be a lightweight protocol or use lightweight mechanisms for communication, such as Hypertext Transfer Protocol (HTTP) or shared memory. Microservices may communicate with each other in any combination, such as illustrated in FIG. 3B, which demonstrates an example embodiment of Microservice 1 0340 to Microservice m 0350 in FIG. 3A as the set of microservices Microservice 1 0360, Microservice 2 0362, Microservice 3 0364, and Microservice 4 0366. Some microservices may be able to communicate with a plurality of other microservices, such as the circle of communication between Microservice 1 0360, Microservice 2 0362, and Microservice 4 0366 in FIG. 3B. Other microservices may only be accessed by a single other microservice, such as the communication between Microservice 2 0362 and Microservice 3 0364.

In some scenarios, communication between microservices may require authentication. The authentication may include tenant credentials, or user credentials for a user of the tenant. The authentication may include credentials for the microservice initiating the communication, or credentials for the application 0310 of which the microservices are a part. The authentication may be handled by the receiving microservice, or may be handled by the environment in which the receiving microservice is deployed. Such authentication may be part of the application 0310, or may be provided by an outside application or a third party authentication service. Further, such communications may be encrypted, and the types of authentication may be combined in any way. Single-sign on (SSO) is especially useful for applications using an MSA if authentication between the microservices is used.

Generally, a single microservice serves as a user interface, as illustrated by Microservice 1 0360, which is accessible by Tenant 1 0320 through Tenant n 0330. Because these are microservices, they do not expose a public API and hence do not automatically expose their data. However, referring again to FIG. 3A, each microservice 0340 through 0350 does have an interface that is available, both by design and by deployment, to the appropriate other microservices 0340 through 0350 that form the application 0310. The microservice interface may be limited to only be available to other microservices that form the application 0310; this may be accomplished by the microservice itself or by the environment into which the microservice is deployed, or a combination thereof. Generally, good security practice is to only allow microservices to communicate that are required to communicate to execute the functions of the software application 0310. Communication between microservices can also be encrypted, such as with SSL.

Because microservices are independent software artifacts, when deployed they may be hosted separately. Each microservice 0340 through 0350 may execute in a separate thread, on a separate processor, and/or on a separate host or node. This also can allow independent hosting configurations for each microservice 0340 through 0350, dependent upon the needs of the microservice. This flexibility can allow for greater customer service or customization, more efficient use of system resources, or reduced costs in running the application.

An MSA may be implemented pursuant to representational state transfer (REST) principles. RESTful microservices allow requesting microservices to access and manipulate textual representations of resources using a uniform and predefined set of stateless operations. RESTful requests are made to a resources uniform resource identifier (URI) and the response to the request may be in XML, HTML, JSON, or other formats. A RESTful implementation may use HTTP, making the predefined HTTP operations available (such as GET, POST, PUT, etc.). RESTful systems use stateless protocols and standard predefined operations, which can increase their performance, reliability, and scalability. Further, such systems may update a single resource or service without affecting the entire application, making the application 0310 easily modifiable and portable. This makes an MSA implemented following REST especially powerful.

Example 4—Architecture Overview

Figure 4:
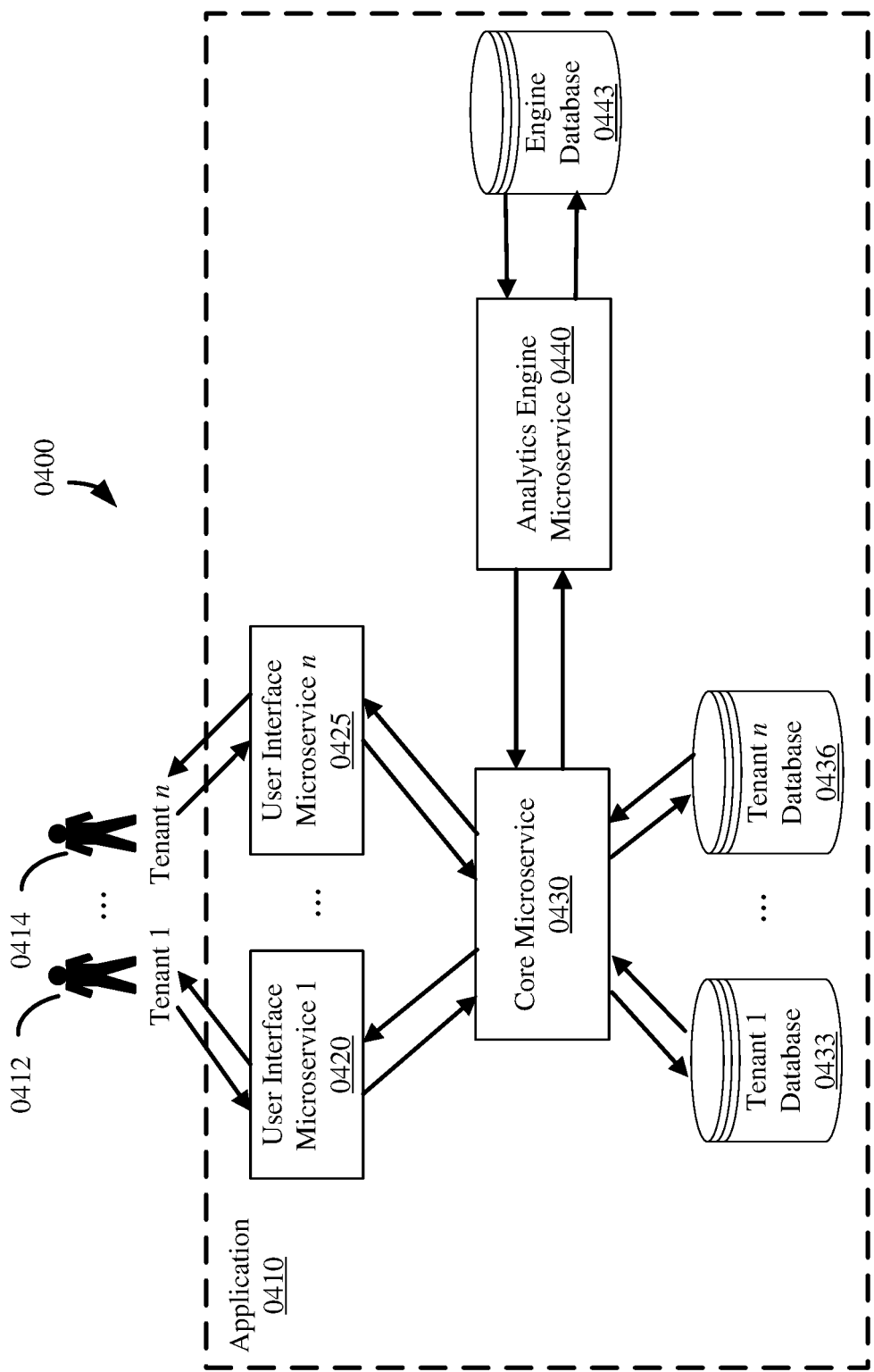
FIG. 4 is a schematic diagram depicting a microservice architecture for a multitenant application based on disclosed technologies.

FIG. 4 illustrates a basic architecture 400 of one embodiment of the disclosed technologies. Leveraging an MSA, a multitenant application 0410 is formed from a plurality of microservices. The multitenant application 0410 includes: a plurality of interface microservices 0420 through 0425, a core microservice 0430, a plurality of tenant databases 0433 through 0436, an analytics engine microservice 0440, and an analytics engine database 0443. Any of the depicted databases may include or be implemented as a flat-file database, a relational database, a separate system with a database management system (DBMS), or a logical database, such as an individual schema within a DBMS or other database.

The plurality of user interface microservices 0420 through 0425 provide a user interface to users for tenants Tenant 1 0412 through Tenant n 0414, and are coupled to the core microservice 0430. Each user interface microservice 1 to n (1 . . . n) 0420 through 0425 corresponds to each tenant 1 to n (1 . . . n) 0412 through 0414, such that each tenant of the multitenant application 0410 has a dedicated user interface microservice. In one embodiment, each user of each tenant may have its own dedicated user interface microservice as well. In another embodiment, all or a portion of the users of a tenant may share a user interface microservice for that tenant. A user interface microservice may provide user interface logic, such as formatting data for presentation to a user, receiving data from a user, or exporting data. Presentation to a user may include a graphical user interface. A user interface microservice may be customized for its corresponding tenant.

In some scenarios, one or more of the user interface microservices may be replaced with another form of a user interface. For example, a user interface may be provided by a thin client or a thick client application. A user interface may also be provided by a different application altogether, developed to interface with the application 0410. A user interface may also be provided by a web portal or web application.

The core microservice 0430 provides core application functionality and is coupled to the plurality of user interface microservices 0420 through 0425, the plurality of tenant databases 0433 through 0436, and the analytics engine microservice 0440. Core application functionality may include business logic, programmatic logic, and data persistence logic. Business logic may include performing user requested functionality, or routing the user-requested functionality to the appropriate microservice. Programmatic logic may include providing functionality for sending and receiving data with the user interface microservices 0420 through 0425 and the analytics engine microservice 0440, or formatting data for sending and receiving. Data persistence logic may include storing data in or retrieving data from the plurality of the tenant databases 0433 through 0436, or formatting data for storing and retrieving. The core microservice 0430 may also provide logic to maintain the data integrity of each of the tenants' 0412 through 0414 data. This may include maintaining data separation of the tenant data of each tenant. Thus, the core microservice 0430 may provide data isolation functionality such that no tenant data is shared or commingled with other tenants' tenant data.

The plurality of tenant databases 1 to n (1 . . . n) 0433 through 0436 persist tenant data for their corresponding tenants 1 to n (1 . . . n) 0412 through 0414. In one embodiment, each tenant has a corresponding tenant database that stores only its tenant data, such that each tenant database has data from only one tenant and no tenant data is commingled in a database with tenant data from another tenant.

The analytics engine microservice 0440 provides analytics logic and data persistence logic. Analytics logic includes analysis on data available in the analytics engine database 0443. Such analysis may include machine learning analysis or statistical algorithm development based on the data in the analytics engine database 0443. Data persistence logic may include storing and retrieving data in the analytics engine database 0443, or formatting data for storing and retrieving.

The analytics engine database 0443 persists data provided to the analytics engine microservice 0440 from the core microservice 0430. In one embodiment, the analytics engine database 0443 maintains the data with its association with its corresponding tenant. In another embodiment, the analytics engine maintains the data with each profile in the data remaining distinct and separate.

Example 5—Architecture with Additional Core Microservice Instances

Figure 5:
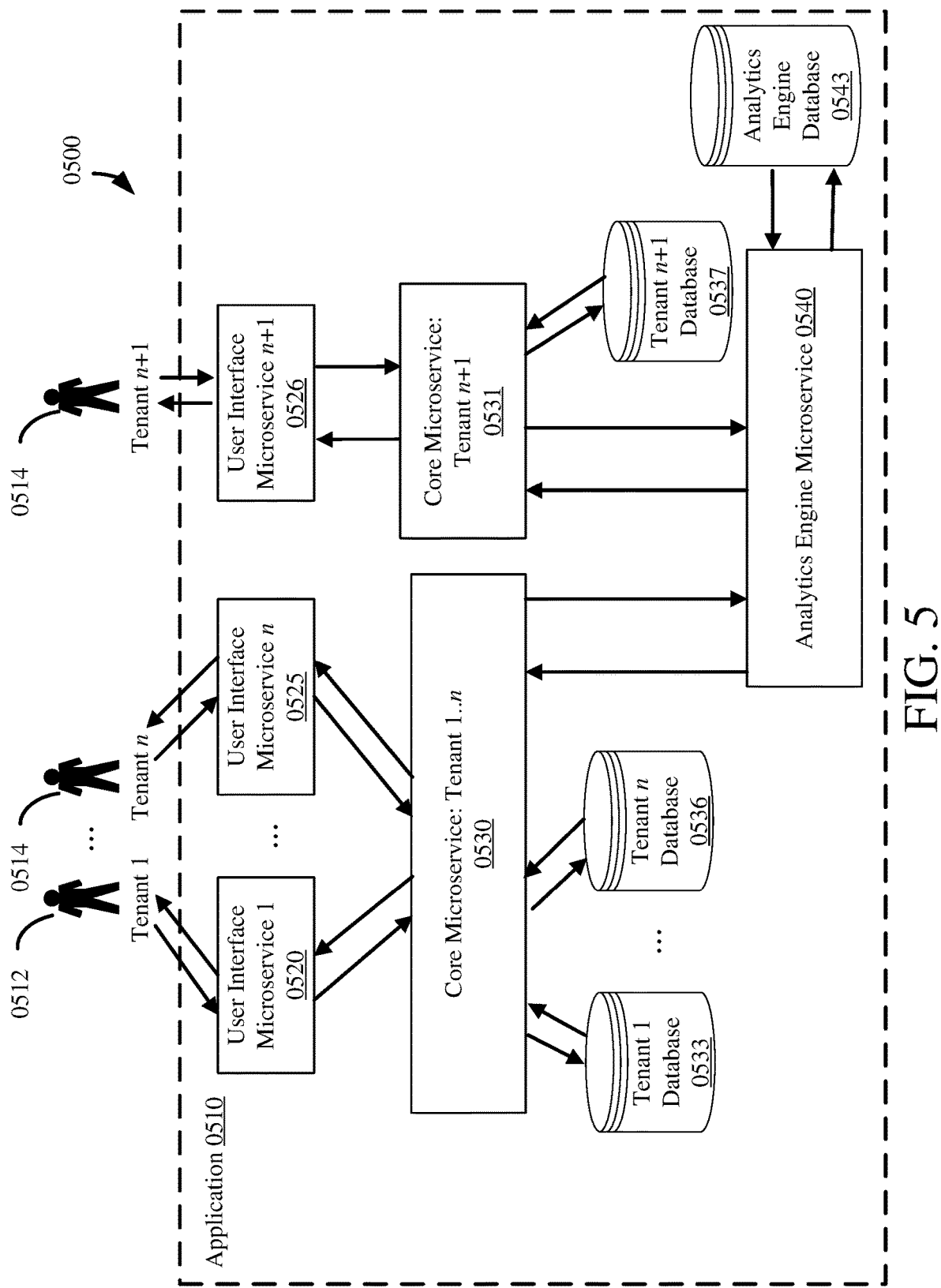
FIG. 5 is a schematic diagram depicting a microservice architecture for a multitenant application based on disclosed technologies with multiple instances of the core microservice.

FIG. 5 illustrates an architecture 0500, similar to architecture 0400 shown in FIG. 4 (described in Example 4—Architecture Overview), but with additional instances of the core microservice. In one embodiment, in a multitenant application 0510, an instance of the core microservice 0530 may provide core application functionality to tenants 1 to n (1 . . . n) 0512 through 0514, through their respective user interface microservices 1 to n (1 . . . n) 0520 through 0525. A second instance of the core microservice 0531 may provide core application functionality to an additional tenant, Tenant n+1 0514, through its user interface microservice n+1 0526. This may be repeated for further tenants, tenant n+2, etc., through respective additional user interface microservices.

Each instance of the core microservice may be coupled to one or more of the tenant databases, such as databases 533, 536, 537, that correspond to their respective tenants. In some scenarios, a given tenant database will only be accessible by a given instance of the core microservice (which is the instance used by the tenant for the tenant database). Each instance of the core microservice 0530 and 0531 is coupled to the analytics engine microservice 0540, which is coupled to the analytics engine database 0543. In one embodiment, each instance of the core microservice is independent from the other instances of the core microservice, such that no instance of the core microservice communicates with any other instance of the core microservice —they are mutually independent.

The addition of instances of the core microservice may be continued for varying sets of tenants, such that a plurality of core microservice instances may provide core application functionality to separate pluralities of tenants. This can allow for increased flexibility in scaling and delivering the multitenant application 0510 to a large or growing number of tenants. It also can allow for greater load balancing between instances, which provides greater responsiveness and better service to each tenant. It also can allow for increased hosting options, as each instance of the core microservice can be hosted separately. Such changes in deployment of instances of the core microservice may be transparent to users or tenants.

In a further embodiment, the value 'n' under Tenant n 0514 (etc.) may be set to 1, such that there is a single tenant for each instance of the core microservice. This embodiment provides a unique instance of the core microservice for each tenant. In this embodiment, the core microservice could be customized for each tenant. Such an embodiment can be described as a data silo for the tenant data, with data accessibility accomplished by, and limited to, providing anonymized data to the analytics engine microservice 0540.

Example 6—Architecture with Microservices by Tenant Type

Figure 6:
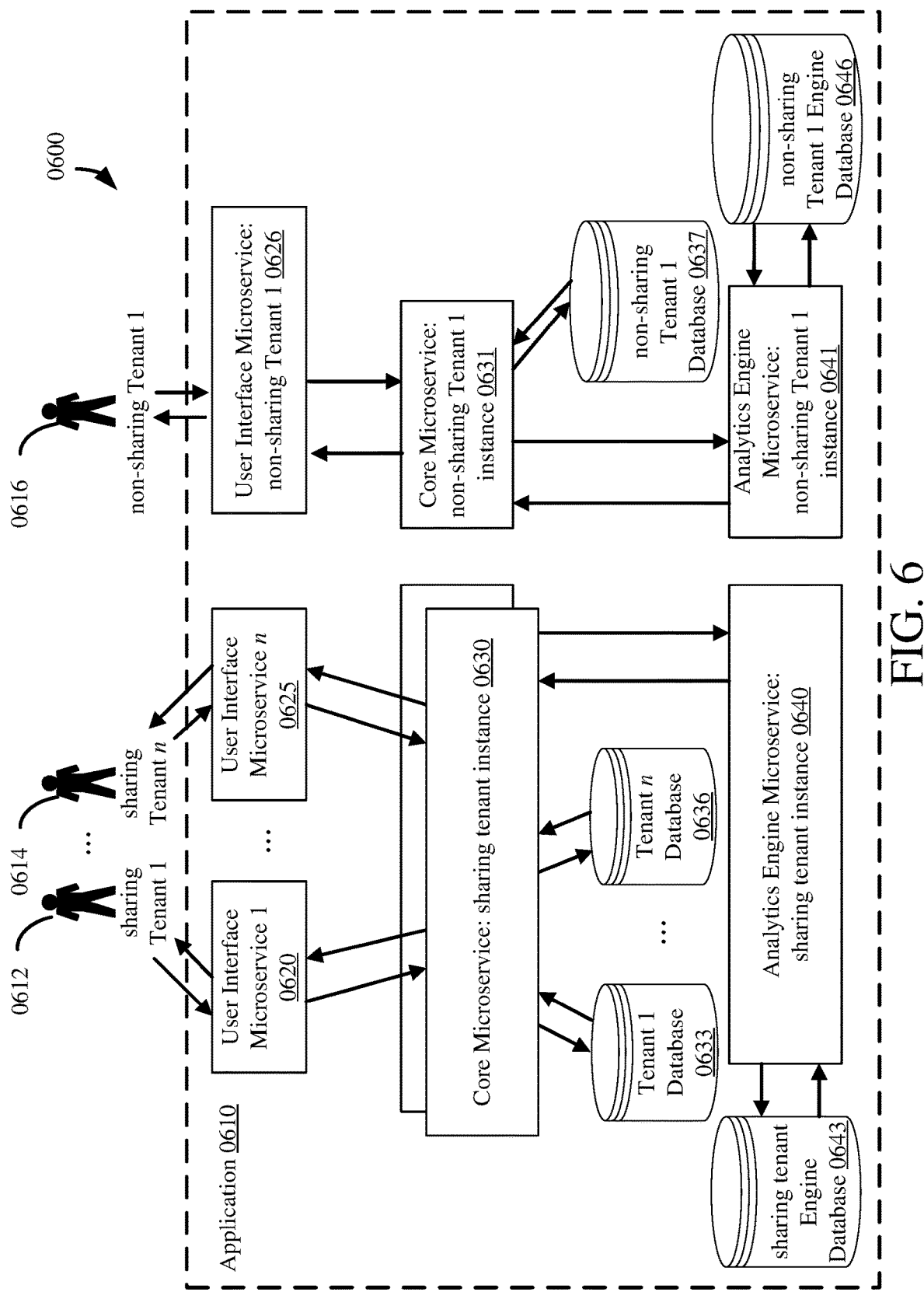
FIG. 6 is a schematic diagram depicting a microservice architecture for a multitenant application based on disclosed technologies, with multiple instances of a core microservice and additional segregated instances of the core microservice and analytics engine microservice based on tenant type (such as sharing and non-sharing).

FIG. 6 illustrates an architecture 0600, similar to architecture 0400 shown in FIG. 4 (described in Example 4—Architecture Overview) and architecture 0500 shown in FIG. 5 (described in Example 5—Architecture with Additional Core Microservice Instances), but with further additional instances of a core microservice provided based on the type of tenant. The type may be any attribute given to a tenant that creates useful categorizations of the tenants.

In one embodiment, tenants may elect to share their tenant data, or not share their tenant data, thus identifying the type of tenant as sharing or non-sharing. Tenants that share their tenant data, such as Tenant 1 0612 to Tenant n 0614, may access an application 0610 using the multitenant application architecture shown in FIG. 5. This architecture includes user interface microservices 1 to n 0620 through 0625, core microservice 0630 (which may have multiple instances for additional sharing tenants), sharing tenant databases 1 to n 0633 through 0636, analytics engine microservice 0640, and a sharing tenant analytics engine database 0640. A non-sharing Tenant 1 0616, that selected to not share tenant data, may access the application 0610 with a dedicated instance of the core microservice 0631 through its own user interface microservice 0626. The dedicated instance of the core microservice 0631 may be coupled to a dedicated instance of the analytics engine microservice 0641, which is coupled to a dedicated non-sharing Tenant 1 analytics engine database 0646. Additional non-sharing tenants beyond non-sharing Tenant 1 0616 may have their own respective dedicated instances of a core microservice, analytics engine microservice, and non-sharing tenant analytics engine database. Thus, non-sharing tenants may access the same multitenant application 0610, but be isolated from the sharing tenants 0612 through 0614, and/or from other non-sharing tenants. Such an embodiment forms the application 0610 into data silos for the non-sharing tenants while still aggregating, isolating, and protecting the tenant data for the sharing tenants 0612 through 0614.

In another embodiment, the tenant type may be determined by a customer attribute, such as one representing the version of the software available to the customer or one representing the geographic location of the customer. Such types can be useful for performance enhancement by providing an instance that is geographically closer to the customer, or assigning rules based on data privacy laws associated with a particular jurisdiction. In such scenarios, the tenants may not have dedicated instances of the core microservice and/or the analytics engine microservice, but instead be grouped by their customer attribute onto shared instances of these microservices.

Example 7—Core Microservice

Figure 7:
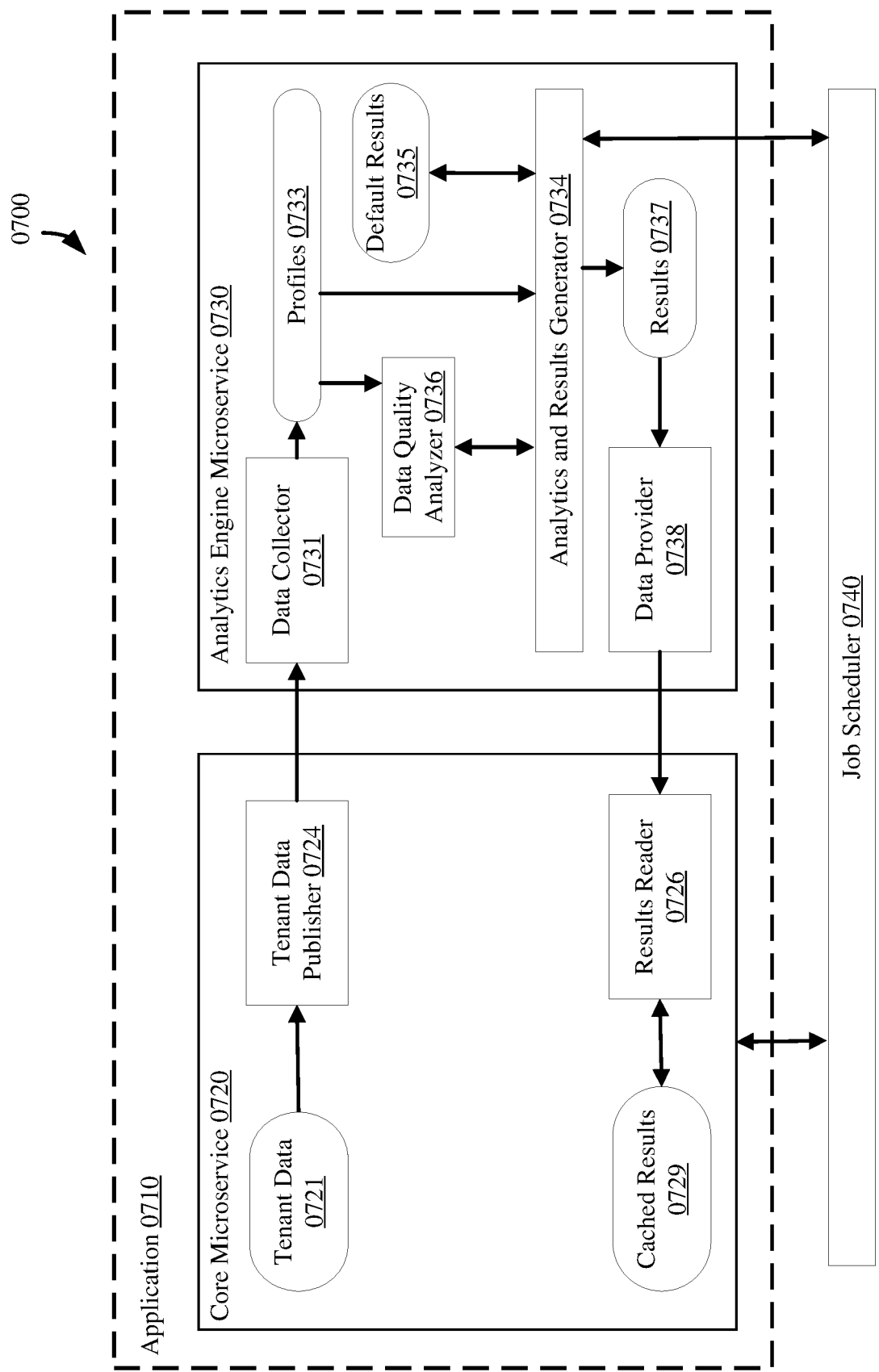
FIG. 7 is a schematic diagram for a core microservice and an analytics engine microservice within a multitenant application using a microservice architecture.

Core application functionality in a core microservice is further illustrated in FIG. 7, under architecture 0700. The core microservice 0720, within application 0710, may obtain tenant data 0721. The tenant data 0721 may be received from a user interface microservice or from a tenant database. If the tenant data 0721 is received from a user interface microservice, it is the responsibility of the core microservice 0720 to store the tenant data in the applicable tenant database; the applicable tenant database is the tenant database reserved for the tenant from which the tenant data 0721 came. The core microservice 0720 is responsible for isolating the tenant data 0721 from all other tenants' tenant data, which in part includes storing the tenant data only in the tenant database for that tenant.

The tenant data 0721 may be provided to the analytics engine microservice 0730 by the tenant data publisher 0724. The core microservice 0720 may also request data analysis from the analytics engine microservice 0730. The core microservice 0720 receives analysis results with a results reader 0726. The core microservice 0720 may then provide these results to a user interface microservice for the applicable tenant. The core microservice 0720 may perform business logic using the results prior to providing the results to an applicable user interface microservice.

The results reader 0726 may maintain cached results 0729, into which it stores results received. The results reader 0726 may also access the cached results 0729 to retrieve results to use when the analytics engine microservice 0730 does not provide results or is not available. The results reader 0726 may also access and use the cached results 0729 when there is no need to communicate with the analytics engine microservice 0730, such as when no new tenant data 0721 has been provided to the analytics engine microservice 0730.

A job scheduler 0740 may be coupled to the core microservice 0720 for triggering actions, such as at certain times or based on particular data inputs. For example, the job scheduler 0740 may trigger the core microservice 0720 to publish new tenant data 0721 to the analytics engine microservice 0730 at a scheduled time or based on an indicator that new tenant data 0721 is available but unpublished. In another example, the job scheduler 0740 may prompt the results reader 0726 to refresh the cached results 0729 on a particular time interval or when the analytics engine microservice 0730 has new data with which to provide a new result for a commonly requested analysis.

Example 8—Analytics Engine Microservice

Analytics engine functionality in the analytics engine microservice 0730 is illustrated in FIG. 7, also under architecture 0700. The analytics engine microservice 0730 receives tenant data 0721 at the data collector 0731. The analytics engine microservice 0730 may receive tenant data 0721 from the core microservice 0720 or the analytics engine database (included within Profiles 0733). The analytics engine microservice 0730 stores tenant data 0721 received from the core microservice 0720 in the analytics engine database. Typically, the analytics engine microservice 0730 does not expose a public API, making it only accessible by the core microservice 0720 (or other internally determined microservices) and can therefore more securely aggregate tenant data.

The data collector 0731 passes the tenant data 0721 to the analytics and results generator 0734, as Profiles 0733. The analytics engine microservice may extract the profiles 0733 from the tenant data 0721 and provide the extracted profiles to the analytics results generator 0734. This may include tenant data from multiple tenants or extracted profiles from multiple tenants. In another embodiment, the profiles 0733 may be limited to a single tenant.

The data collector 0731 may also store the tenant data in the engine database (such as the analytics engine database 0443 of FIG. 4). The data collector 0731 may then retrieve tenant data or profiles, which may be data across multiple tenants, from the analytics engine database to provide to the analytics and results generator 0734, as Profiles 0733. In this way, the analytics engine microservice 0730 may perform analysis and generate results without receiving new data, or without receiving new data from a specific tenant, such as a tenant requesting analysis or results.

The analytics and results generator 0734 performs analysis on the tenant data 0721 or profiles 0733 and generates a result or results 0737 based on the analysis and function requested. The analytics and results generator 0734 may also store default results 0735 and retrieve the default results when expedient. For example, the analytics and results generator 0734 may retrieve default results 0735 when it cannot perform the analysis, an error has occurred in the analysis, or it is known that the analysis will not generate a different result from those in the default results (such as when no new data is available from the data previously used to generate the default results 0735). The analytics and results generator 0734 may create or update default results 0735 based on the most recent analysis performed. It may also create or update the default results 0735 based on the response of a data quality analyzer 0736.

The data quality analyzer 0736 reviews the generated results 0737 and determines the quality of the results. If the quality is sufficiently good, the data quality analyzer 0736 directs the analytics and results generator 0734 to update the default results 0735 with the newly generated results 0737. The data quality analyzer 0736 may do this each time new results 0737 are generated, or may do this periodically, either on a set schedule or based on the job scheduler 0740 triggering the analytics and results generator 0734 to initiate data quality analysis. The data quality analyzer 0736 may analyze all results 0737 generated or only a subset of the results 0737, including only one result 0737. If only a subset of results 0737 are analyzed, any update to the default results 0735 is limited to those results analyzed.

The results 0737 from the analytics and results generator 0734 may be a specific value, set of values, an array, a matrix of values, or any combination thereof. The results 0737 may be passed from the analytics and results generator 0734 to the data provider 0738. The data provider 0738 prepares the results 0737 and sends the results to the core microservice 0720, where it is received by the results reader 0726.

The job scheduler 0740 may be coupled to the analytics and results generator 0734 in the analytics engine microservice 0730 for triggering actions, such as at certain times or based on particular data inputs. For example, the job scheduler may trigger the analytics and results generator 0734 to generate new default results 0735 at a scheduled time or based on the receipt of new tenant data 0721. In another example, the job scheduler 0740 may prompt the analytics and results generator 0734 to request data quality analysis from the data quality analyzer 0736; this may be based on a particular schedule, the receipt of new data, or the amount of time since the previous data quality analysis. The job scheduler 0740 for the analytics engine microservice 0730 may be the same scheduler as for the core microservice 0720, or it may be a separate job scheduler.

Example 9—Analytics and Results

The analytics and results generator 0734 shown in FIG. 7 performs analysis on tenant data 0721. This analysis may be panel data analysis. The panel data analysis may be statistical analysis across the panel data in the tenant data 721 (which can include data of multiple tenants), utilizing computational statistics algorithms. The panel data analysis may also be accomplished by machine learning algorithms, utilizing methods such as supervised or unsupervised learning, clustering, anomaly detection, Bayesian statistical methods, or neural networks. Computational statistics or machine learning can provide significant advantages in providing higher quality or more predictive analysis results, yet these methods are typically more effective with large amounts of data. Thus, the accuracy or value of the analysis can depend, in part, on the volume of tenant data available for use in the analysis.

A tenant may select to not make their tenant data available to other tenants for use during analysis. In this scenario, the non-sharing tenant only has access to its own tenant data for analysis. Thus, the analytics and results generator will only perform analysis for a non-sharing tenant on that tenant's tenant data. Depending on the analysis, this may result in a lower quality result, or no result if there is insufficient data. A tenant may alternatively select to make their tenant data available to other tenants for use during analysis. In this scenario, the sharing tenant has access to all tenant data from other sharing tenants. This scenario increases the data pool for use in the analysis, and so is likely to provide higher quality results.

The results 0737 generated may be in the form of a single variable or a set of variables, an array, a matrix, or any combination thereof. When providing results, AB testing may be utilized to avoid bias when proposing results.

Example 10—Core Microservice Anonymization

Figure 8:
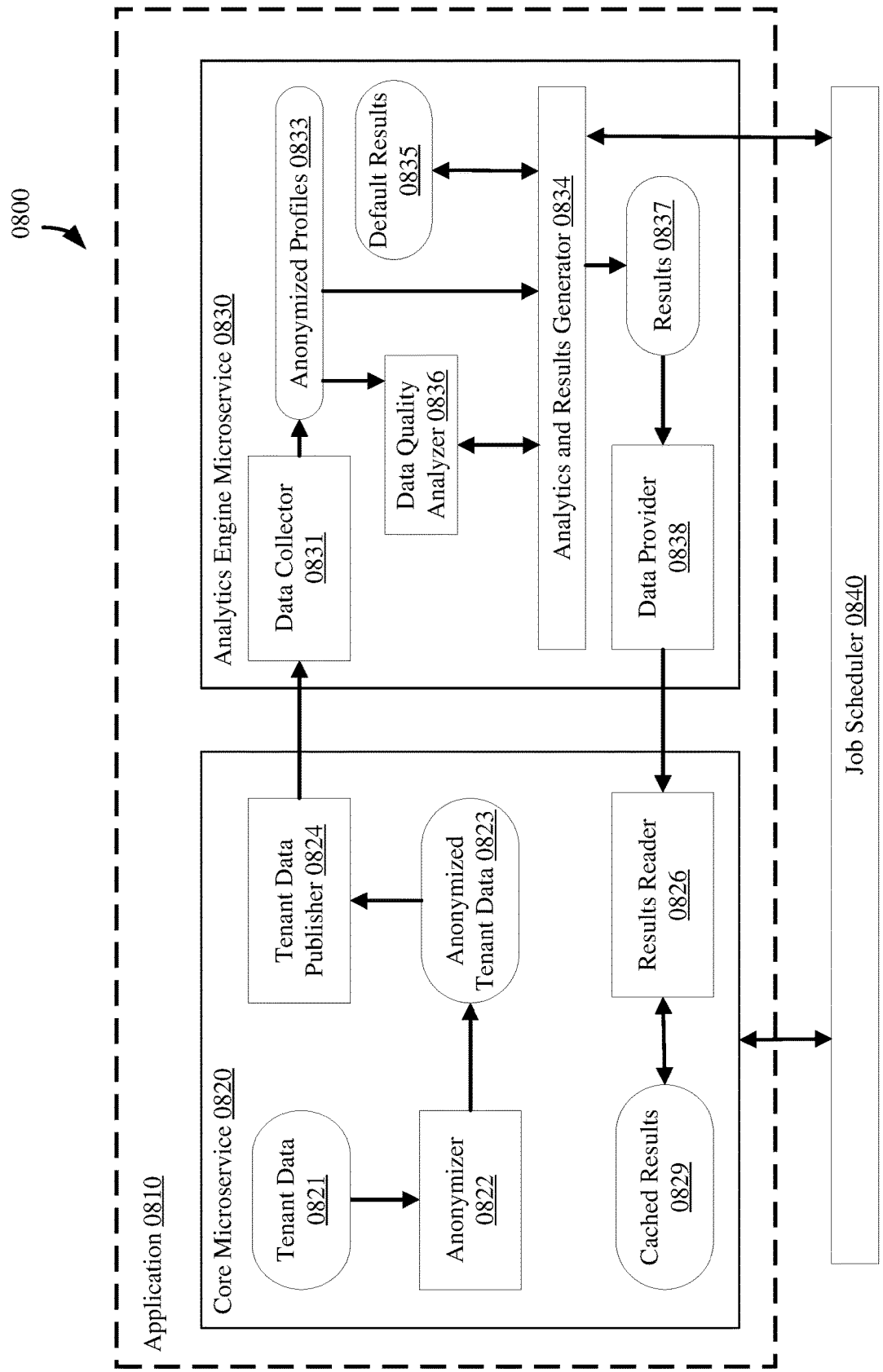
FIG. 8 is a schematic diagram for a core microservice and an analytics engine microservice within a multitenant application using a microservice architecture, with anonymization functionality in the core microservice.

The architecture 0700 of FIG. 7 (described in Example 7—Core Microservice and Example 8—Analytics Engine Microservice) may include anonymization functionality, as illustrated in architecture 0800 of FIG. 8. Architecture 0800 for application 0810 is analogous to architecture 0700, with the addition of anonymization functionality. In one embodiment of the disclosed technologies, a core microservice 0820 may include functionality to anonymize tenant data 0821 before sending the tenant data to an analytics engine microservice 0830. The tenant data 0821 is transformed by an anonymizer 0822 into anonymized tenant data 0823, which then is sent by a tenant data publisher 0824 to an analytics engine microservice 0830, where it is received by a data collector 0831. Anonymized profiles 0833 from the anonymized tenant data 0823 are then stored in an analytics engine database (as shown in FIGS. 4, 5, and 6) and used by the analytics engine microservice 0830.

The anonymized profiles 0833 from the anonymized tenant data are then used by the analytics engine microservice 0830 to generate results 0837. The analytics and results generator 0834 may use default results 0835 in a variety of circumstances as described herein. Further, the analytics and results generator 0834 may use a data quality analyzer 0836, which may also receive the anonymized profiles 0833, to analyze the quality of the anonymized profiles 0833 or the results 0837. The results 0837 are sent to the core microservice 0820 by a data provider 0838, and are received at the core microservice by a results reader 0826. The results reader 0826 may store the results 0837 as cached results 0829; the results reader 0826 may also read from the cached results 0829 in a variety of circumstances described herein.

In one embodiment, the core microservice 0820 always anonymizes tenant data before sending tenant data outside of the core microservice. Thus, only anonymized data 0823 is sent for analysis in the analytics engine microservice 0830, or to other microservices, making the analytics engine microservice only aware of anonymized tenant data. This makes sensitive information in the tenant data 0821 less susceptible to unauthorized receipt or access by housing it in the core microservice 0820. Restricting microservice access to tenant data including sensitive information can increase the security of the tenant data 0821.

In another embodiment, the tenant data 0821 including sensitive information may be provided back to the given tenant's user interface microservice. This may include secure authorization and identification of the user before accepting a request to provide tenant data including sensitive information.

If additional information is generated or otherwise used for the anonymization of the tenant data 0821, such as an encryption key or secret, that data may also be stored in the tenant's tenant database. In general, any such data should not typically be provided to the analytics engine microservice 0820, or other microservices, but may need to be accessible, such as manually, to a technical user or system administrator for error checking or manual decryption of the anonymized tenant data 0823.

A job scheduler 0840 may be coupled to the core microservice 0820 for triggering actions, such as at certain times or based on particular data inputs. For example, the job scheduler 0940 may trigger the core microservice 0820 to publish new tenant data 0821 to the analytics engine microservice 0830 at a scheduled time or based on an indicator that new tenant data 0821 is available but unpublished. In another example, the job scheduler 0840 may prompt the results reader 0826 to refresh the cached results 0829 on a particular time interval or when the analytics engine microservice 0830 has new data with which to provide a new result for a commonly requested analysis.

The job scheduler 0840 may be coupled to the analytics and results generator 0834 in the analytics engine microservice 0830 for triggering actions, such as at certain times or based on particular data inputs. For example, the job scheduler may trigger the analytics and results generator 0834 to generate new default results 0835 at a scheduled time or based on the receipt of new tenant data 0821. In another example, the job scheduler 0840 may prompt the analytics and results generator 0834 to request data quality analysis from the data quality analyzer 0836; this may be based on a particular schedule, the receipt of new data, or the amount of time since the previous data quality analysis. The job scheduler 0840 for the analytics engine microservice 0830 may be the same scheduler as for the core microservice 0820, or it may be a separate job scheduler.

Example 11—Analytics Engine Microservice Anonymization

Figure 9:
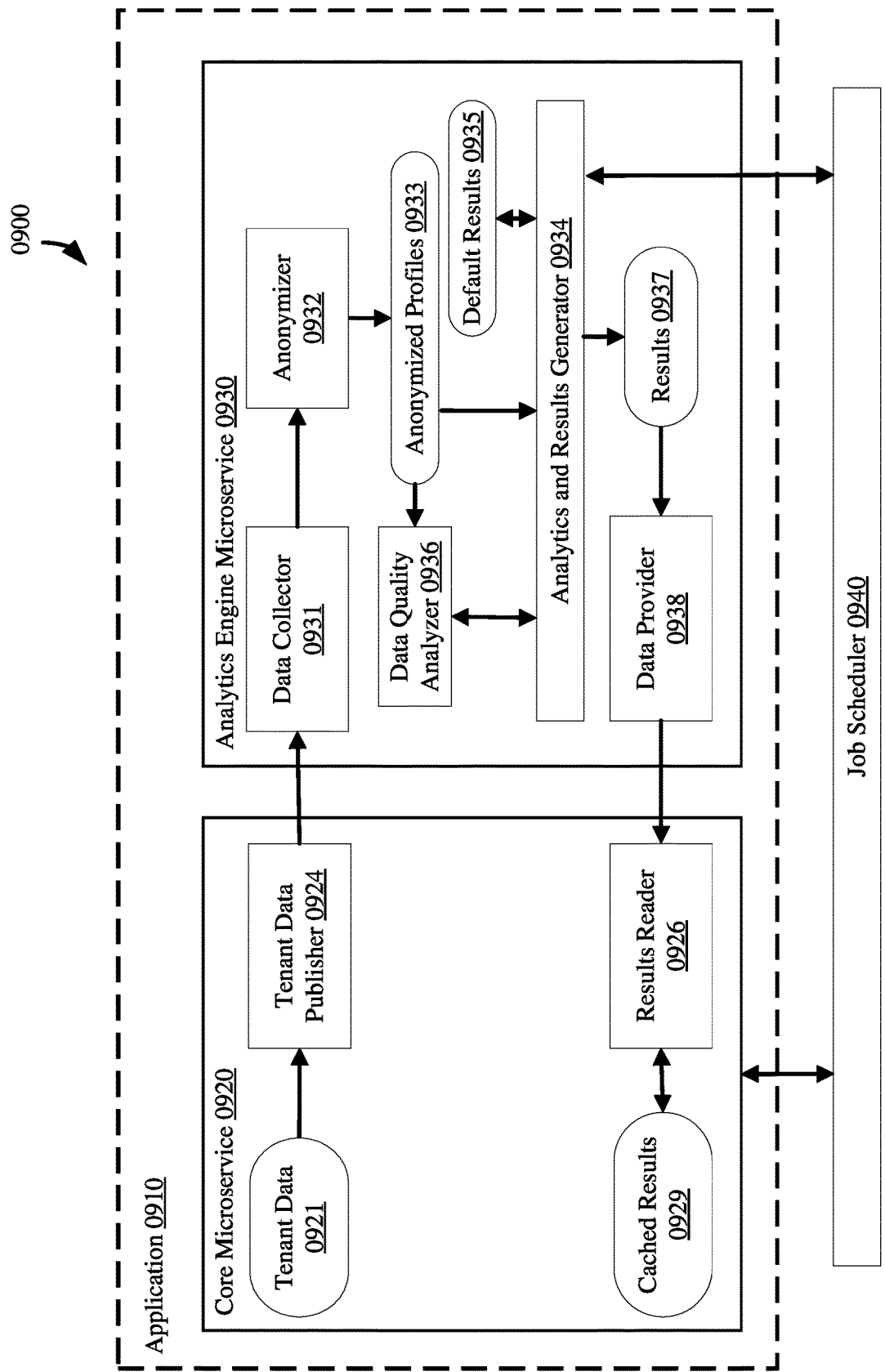
FIG. 9 is a schematic diagram for a core microservice and an analytics engine microservice within a multitenant application using a microservice architecture, with anonymization functionality in the analytics engine microservice.

The architecture 0700 of FIG. 7 (described in Example 7—Core Microservice and Example 8—Analytics Engine Microservice) may include anonymization functionality, as illustrated in FIG. 9. Architecture 0900 for application 0910 is analogous to architecture 0700, with the addition of anonymization functionality. In one embodiment of the disclosed technologies, an analytics engine microservice 0930 may include functionality to anonymize tenant data 0921 after receiving tenant data at a data collector 0931 sent by a tenant data publisher 0924 from a core microservice 0920. The tenant data 0921 is transformed by the anonymizer 0932 into anonymized tenant data, such as anonymized profiles 0933, which then is provided to the analytics and results generator 0934 for analysis. The anonymized profiles 0933 from the anonymized tenant data are then used by the analytics engine microservice 0930 to generate results 0937. The analytics and results generator 0934 may use default results 0935 in a variety of circumstances as described herein. Further, the analytics and results generator 0934 may use a data quality analyzer 0936, which may also receive the anonymized profiles 0933, to analyze the quality of the anonymized profiles 0933 or the results 0937. The results 0937 are sent to the core microservice 0920 by a data provider 0938, and are received at the core microservice by a results reader 0926. The results reader 0926 may store the results 0937 as cached results 0929; the results reader 0926 may also read from the cached results 0929 in a variety of circumstances described herein.

The anonymized tenant data as the anonymized profiles 0933 may also be stored in the analytics engine database (as shown in FIGS. 4, 5, and 6). The tenant data 0921 is typically only stored in the analytics engine database once it is anonymized. The analytics and results generator 0934 may retrieve the anonymized profiles 0933 directly from the analytics engine database rather than obtain them directly from the anonymizer 0932.

A job scheduler 0940 may be coupled to the core microservice 0920 for triggering actions, such as at certain times or based on particular data inputs. For example, the job scheduler 0940 may trigger the core microservice 0920 to publish new tenant data 0921 to the analytics engine microservice 0930 at a scheduled time or based on an indicator that new tenant data 0921 is available but unpublished. In another example, the job scheduler 0940 may prompt the results reader 0926 to refresh the cached results 0929 on a particular time interval or when the analytics engine microservice 0930 has new data with which to provide a new result for a commonly requested analysis.

The job scheduler 0940 may be coupled to the analytics and results generator 0934 in the analytics engine microservice 0930 for triggering actions, such as at certain times or based on particular data inputs. For example, the job scheduler may trigger the analytics and results generator 0934 to generate new default results 0935 at a scheduled time or based on the receipt of new tenant data 0921. In another example, the job scheduler 0940 may prompt the analytics and results generator 0934 to request data quality analysis from the data quality analyzer 0936; this may be based on a particular schedule, the receipt of new data, or the amount of time since the previous data quality analysis. The job scheduler 0940 for the analytics engine microservice 0930 may be the same scheduler as for the core microservice 0920, or it may be a separate job scheduler.

Example 12—Anonymizer and Anonymization

FIG. 10 provides details of an embodiment of the anonymizer 0822 of FIG. 8 (described in Example 10—Core Microservice Anonymization) or the anonymizer 0932 as shown in FIG. 9 (described in Example 11—Analytics Engine Microservice Anonymization). Tenant data 1010, which includes profile data 1 to n (1 . . . n) 1012 through 1016, is received by an anonymizer 1020. The anonymizer 1020 processes the identifying information 1022 for a profile 1012 in the tenant data 1010 and a secret 1024 to generate by the anonymization generator 1025 an anonymized profile data 1032.

The identifying information 1022 is the attribute or attributes that uniquely identifies the entity the profile represents and is to be anonymized. The anonymized profile data 1032 may include a pseudonym (or alias) 1033 and the remaining profile data that is not identifying or sensitive information 1035. The anonymizer 1020 does this for each profile 1012 through 1016 in the tenant data 1010. The set of anonymized profiles 1032 through 1036 forms all or a portion of the anonymized tenant data 1030. A variety of anonymization techniques can be used, such as randomization, encryption, hashing, or data masking. In this way, through one or more of these methods or other methods appreciated by those skilled in the art, the anonymizer 1020 protects identifying information in the tenant data 1010.

In one embodiment, the anonymizer 1020 maps the identifying attribute or attributes 1022 for each profile to a pseudonym 1033. Such mapping need not include the use of a secret 1024. The pseudonym 1033 may be a random value. This pseudonym 1033 is typically generated only once, making it a stable pseudonym. A stable pseudonym can be leveraged to correlate various data about that entity, such as panel data, which enables more detailed analysis, such as panel data analysis. Thus, the pseudonym may be used to associate results from the analysis for a profile to the profile data. This may include the identifying information of the profile as well.

A stable pseudonym may be stored with its corresponding profile in a tenant database. This may be accomplished in a table in the tenant database, having a column with a column ID for pseudonyms and another column with a different column ID for a profile identifier. Thus, each row may store a pseudonym-profile tuple. A table entry can be created or updated when a new pseudonym 1033 is created or assigned to an identifier 1022. When results are received from an analytics engine microservice, the table can be queried to determine which identifier 1022 is associated with a pseudonym 1033 referenced in the results. An example table can be:

| Employee ID | Pseudonym |
|---|---|
| e1 | 0 |
| e2 | 1 |

Alternatively, the pseudonym may be stored with the profile data itself. The pseudonym may also be stored as a hash of the profile, profile identifier, or the any of the profile data, alone or in combination.

In another embodiment, the anonymization generator 1025 uses a secure hash algorithm to create a pseudonym 1033. This algorithm uses as input a uniquely identifying attribute or attributes 1022 and a secret 1024. The uniquely identifying attribute 1022 may be a person's name. The secret 1024 may be unique for each profile and may be a constant value, maintained with the profile by the core microservice in the applicable tenant database. The secret 1024 is used to map the uniquely identifying attribute 1022 to the pseudonym 1033. The pseudonym 1033 may then be used for all communication and analysis utilizing the profile. The use of a secret in generating the pseudonym 1033 can provide additional data protection, especially in a brute force attack.

In a further embodiment, the anonymizer 1020 may be implemented in its own microservice, separate from the core microservice and/or the analytics engine microservice. In such a scenario, the anonymization microservice would receive tenant data 1010, process it through an anonymizer 1020 and return the anonymized tenant data 1030 to the microservice that requested the anonymization. Alternatively, the requesting microservice may direct that the anonymized tenant data be sent to another microservice.

Example 13—Data Sharing

In one embodiment, each tenant may elect to participate in shared data analysis or not. If a tenant selects to not share their tenant data, then any analytics that non-sharing tenant requests will be performed strictly based on their own tenant data. Their tenant data also will not be available to other tenants as part of the other tenants' data analysis.

If a tenant selects to share their tenant data, then that sharing tenant's anonymized tenant data will be available for data analysis, along with all other tenants' anonymized tenant data that have also selected to share. This gives the sharing tenant access to the anonymized tenant data of all other sharing tenants, creating a much larger pool of data to use. This can be an advantage in various analyses, such as statistical or machine learning data analytics, as may be performed by the analytics engine microservice.

The sharing functionality may be achieved by a sharing indicator, which may be part of the tenant data, but need not be part of the profiles within the tenant data. The sharing indicator may be stored in the tenant's tenant database, may be passed to an analytics engine microservice from a core microservice and subsequently stored in an analytics engine database as well. This is in a manner similar to the tenant data as shown in FIGS. 7, 8, and 9. Once available in the analytics engine microservice, the analytics and results generator may use the sharing indicator to determine what set of data to use, from the analytics engine database, when performing analysis.

In another embodiment, the sharing indicator may be used to indicate if a tenant's data is shared, but not which data to which the tenant has access. In this embodiment, all tenants will have access to shared tenant data, but the pool of shared tenant data will only consist of anonymized tenant data from tenants that elected to share their data. In this way, tenants will not be required to share their tenant data while still gaining the benefit of analysis over all shared tenant data.

Example 14—Architecture for Analytics and Logic Design

Figure 11:
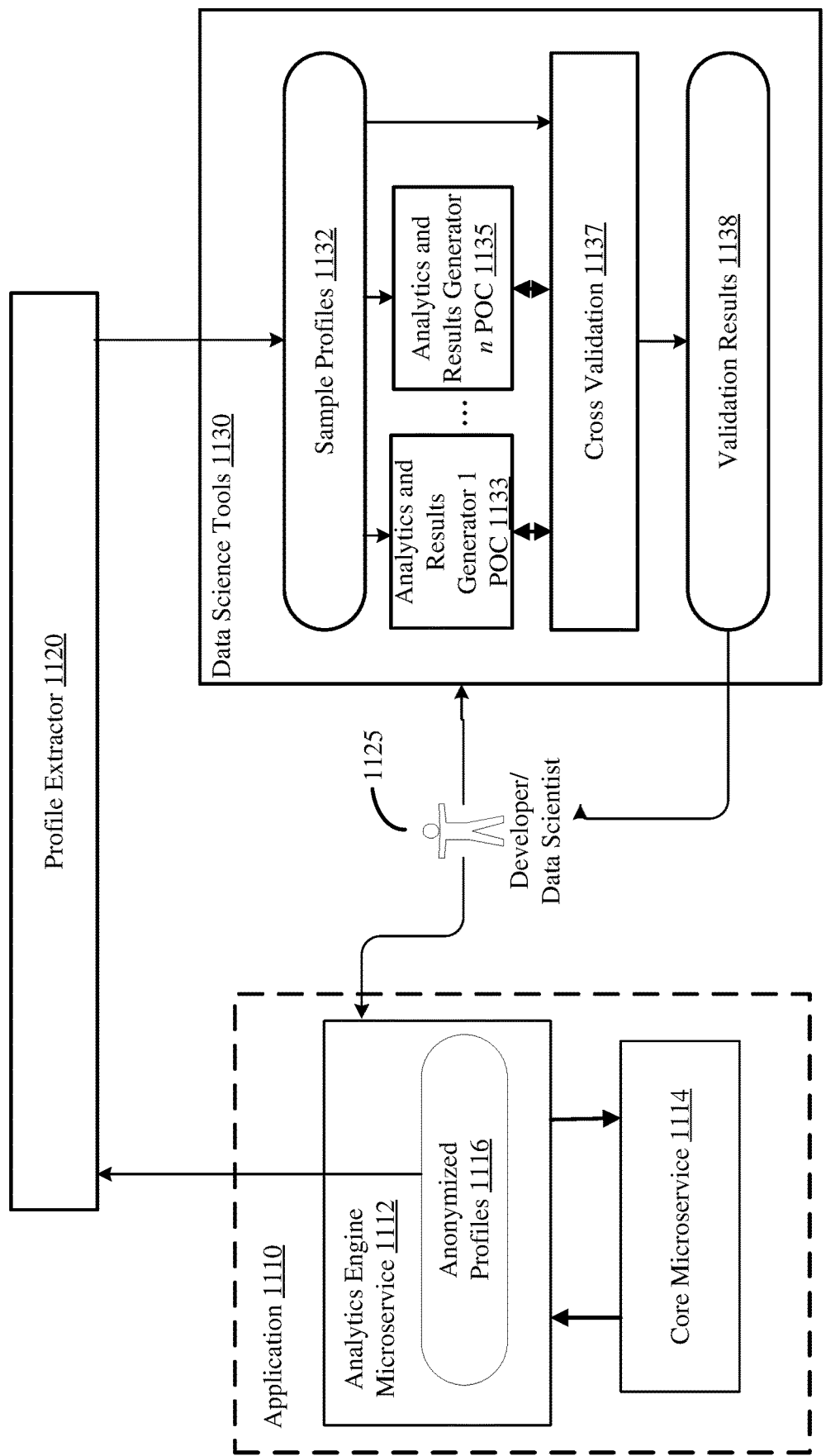
FIG. 11 is a schematic diagram of a development system coupled to an application for use by developers/data scientists.

An expanded architecture for analytics validation and testing is illustrated in FIG. 11. A profile extractor 1120 may extract profiles from anonymized profiles 1116 stored in an analytics engine database (not shown, but as described herein) by an analytics engine microservice 1112 after receiving the data from a core microservice 1114, in an application 1110. The extracted profiles may be any profiles available in the analytics engine database or may be limited to only profiles from sharing tenants. The extracted profiles may act as sample profiles 1132 for use by developers or data scientists 1125 in developing, testing, or validating analytics and results generators. The sample profiles 1132 may be provided to a plurality of differing analytics and results generator proof of concepts (POCs) 1 to n (1 . . . n) 1133 through 1135, which then perform analysis and generate results based on the sample profiles 1132. At cross validation 1137, the results from the plurality of analytics and results generators 1133 through 1135 are compared; this comparison may be done using the original sample profiles 1132 as well as the results from the plurality of POCs.

Validation results 1138 can be provided to a developer or data scientist 1125 for further review and analysis. The developer or data scientist 1125 can then use the results to refine one or more of the analytics and results generator POCs 1133 through 1135, or can decide to implement an efficient or effective POC into the analytics engine microservice 1112. This can be an iterative process. In an embodiment using an artificial neural network to perform the analysis, the sample profiles 1132 may be used to train the neural network. The profile extractor 1120 may extract profiles based on a schedule, a particular data trigger (such as new profiles being available or an amount of time since the previous extraction) or by command received from a developer or data scientist 1125.

Example 15—Microservice Communication Timing

Figure 12:
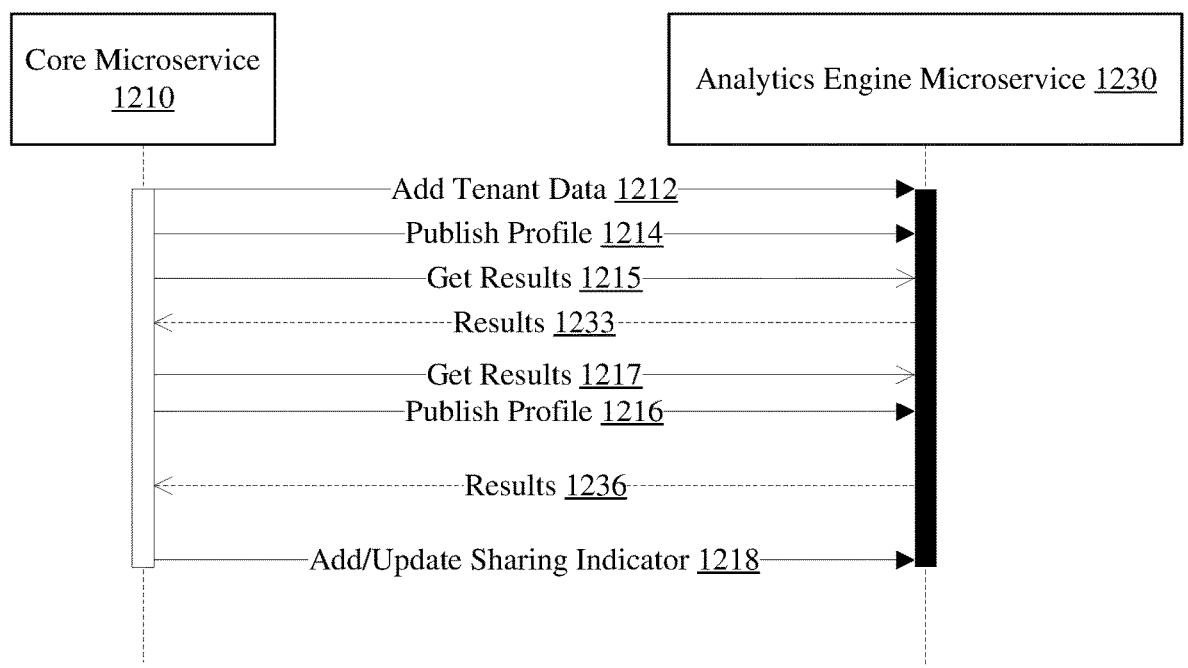
FIG. 12 is a communication timing diagram illustrating example communications between a core microservice and an analytics engine microservice.

FIG. 12 illustrates communication timing between a core microservice 1210 and an analytics engine microservice 1230. The core microservice 1210 sends a communication 1212 to the analytics engine microservice 1230 to add tenant data to an analytics engine database. The core microservice 1210 next may send to the analytics engine microservice 1230 one or more tenant data profiles 1214. The core microservice 1210 next may request analysis and results 1215 from the analytics engine microservice 1230. The analytics engine microservice 1230 returns results 1233 in response to the request 1215. This process may repeat in a varied order 1217, 1216, and 1236. The communications may include a variety of other actions and requests, such as adding or updating a sharing indicator 1218.

Example 16—Microservice Hosting

Figure 13:
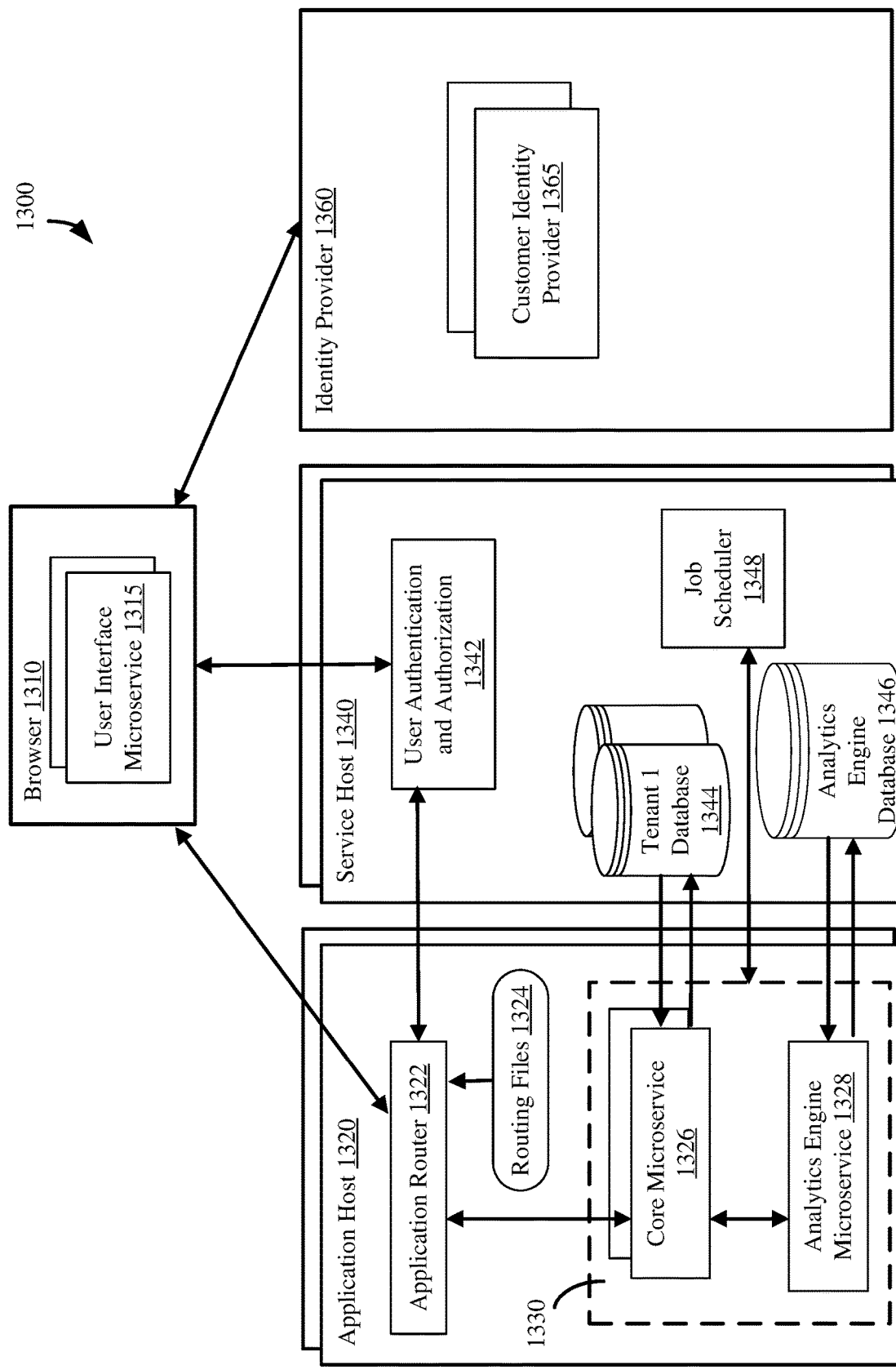
FIG. 13 is a diagram depicting a deployment architecture for the application.

An example arrangement 1300 for deploying and hosting a multitenant application 1330 implementing at least certain disclosed technologies is illustrated in FIG. 13. A user interface microservice 1315 may be hosted in a browser 1310, which may be separate from other systems that host other microservices that form the application 1330. The user interface microservice 1315, through the browser 1310, may communicate with an identity provider 1360 that can authenticate a user's or customer's identity 1365. The user interface microservice 1315, through the browser 1310, may also communicate with user authentication and authorization 1342 hosted at a service host 1340 to authenticate the user or customer and authorize the user to access the application 1330. This authorization may be done in part using the identity confirmation received from the identity provider 1365. The user interface 1315 may then communicate with the application 1330 through an application router 1322, which may direct the user interface microservice 1315 to the correct instance of the core microservice 1326. The application router 1322 may utilize routing files 1324 containing routing information to accomplish this.

The instances of the core microservice 1326 may be hosted by one or more application hosts 1320. Each instance of the core microservice 1326 may be on a separate application host 1320, on the same application host, or deployed amongst a plurality of application hosts 1320 based on varying criteria, such as system load balancing on each host.

The analytics engine microservice 1328 may be hosted on an application host 1320 similar to the core microservice 1326. It may be hosted on the same application host 1320 as one or more of the core microservices 1326, or be hosted separate from any instance of the core microservice 1326.

Tenant databases 1344, an analytics engine database 1346, and a job scheduler 1348 may be hosted by the service hosts 1340. Similarly to the microservices 1326, 1328, they may be hosted within the same host or separately, or in any combination that effectively deploys the services. The number of interchangeable hosting options for each microservice and database should make apparent the flexibility in the disclosed architecture.

Example 17—Tenant Data Storage Process

Figure 14:
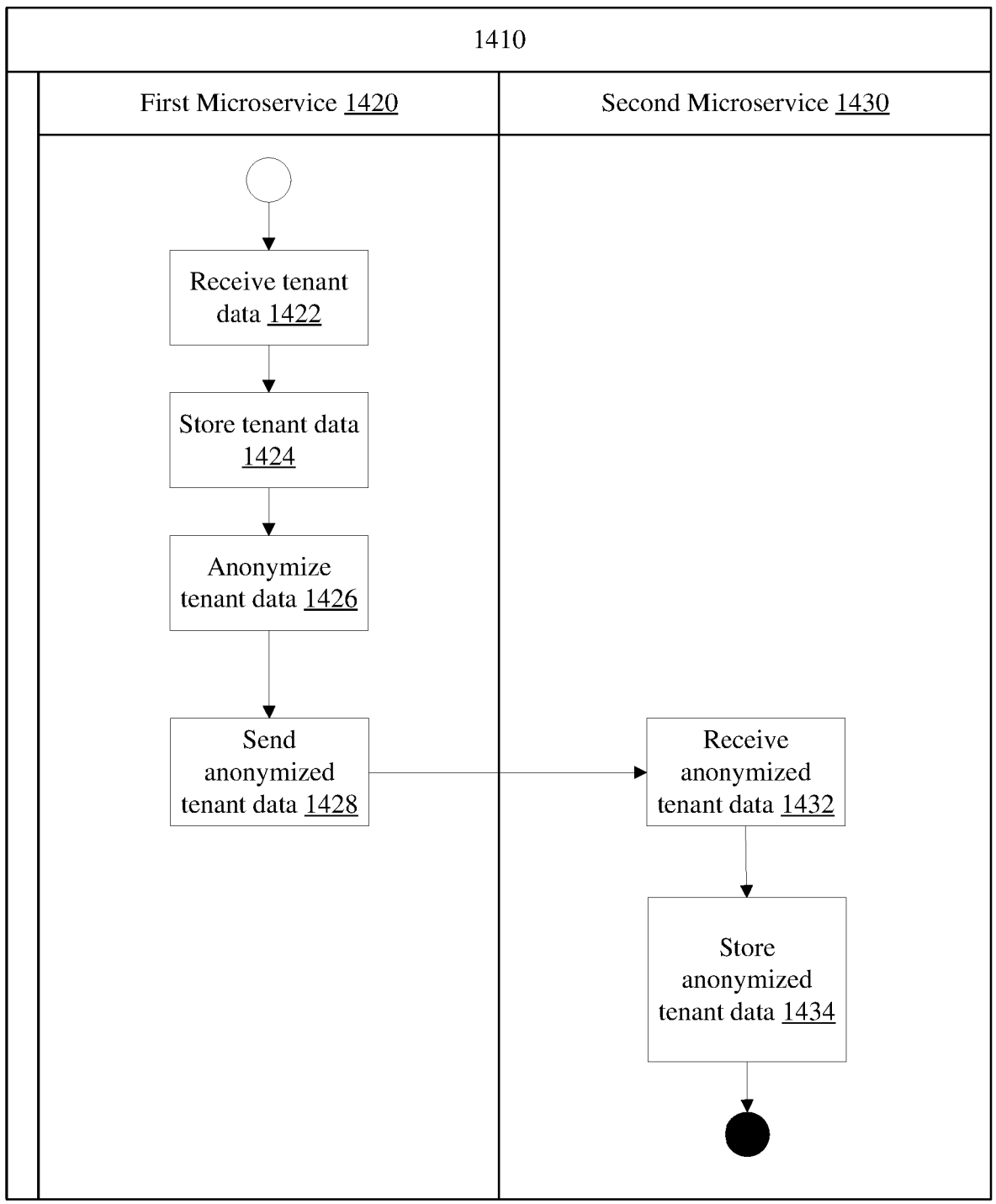
FIG. 14 is a flowchart illustrating a process for storing tenant data.

A process for storing tenant data 1410 is illustrated in FIG. 14. Tenant data is received at 1422 at a first microservice 1420. The first microservice 1420 may be a core microservice as described herein. The first microservice 1422 stores the tenant data at 1424. The tenant data may be stored in a tenant database, as shown in FIG. 4, and this tenant database may exclusively store data for that tenant.

The first microservice 1420 anonymizes the tenant data at 1426. After anonymizing the tenant data, the first microservice 1420 sends the anonymized tenant data 1428 to a second microservice at 1430. In some scenarios, the anonymized tenant data may be sent over a network, passed between threads or nodes, or sent by storing in memory shared by the first microservice and second microservice. In one embodiment, the second microservice 1430 is an analytics engine microservice as described herein. The second microservice receives the anonymized tenant data at 1432 then stores the anonymized tenant data at 1434. The anonymized tenant data may be stored in an analytics engine database, as shown in FIG. 4. By storing only anonymized tenant data in the analytics engine database, the analytics engine microservice 1430 may analyze data at any time while maintaining data privacy.

Example 18—Request Tenant Data Analysis Process

Figure 15A:
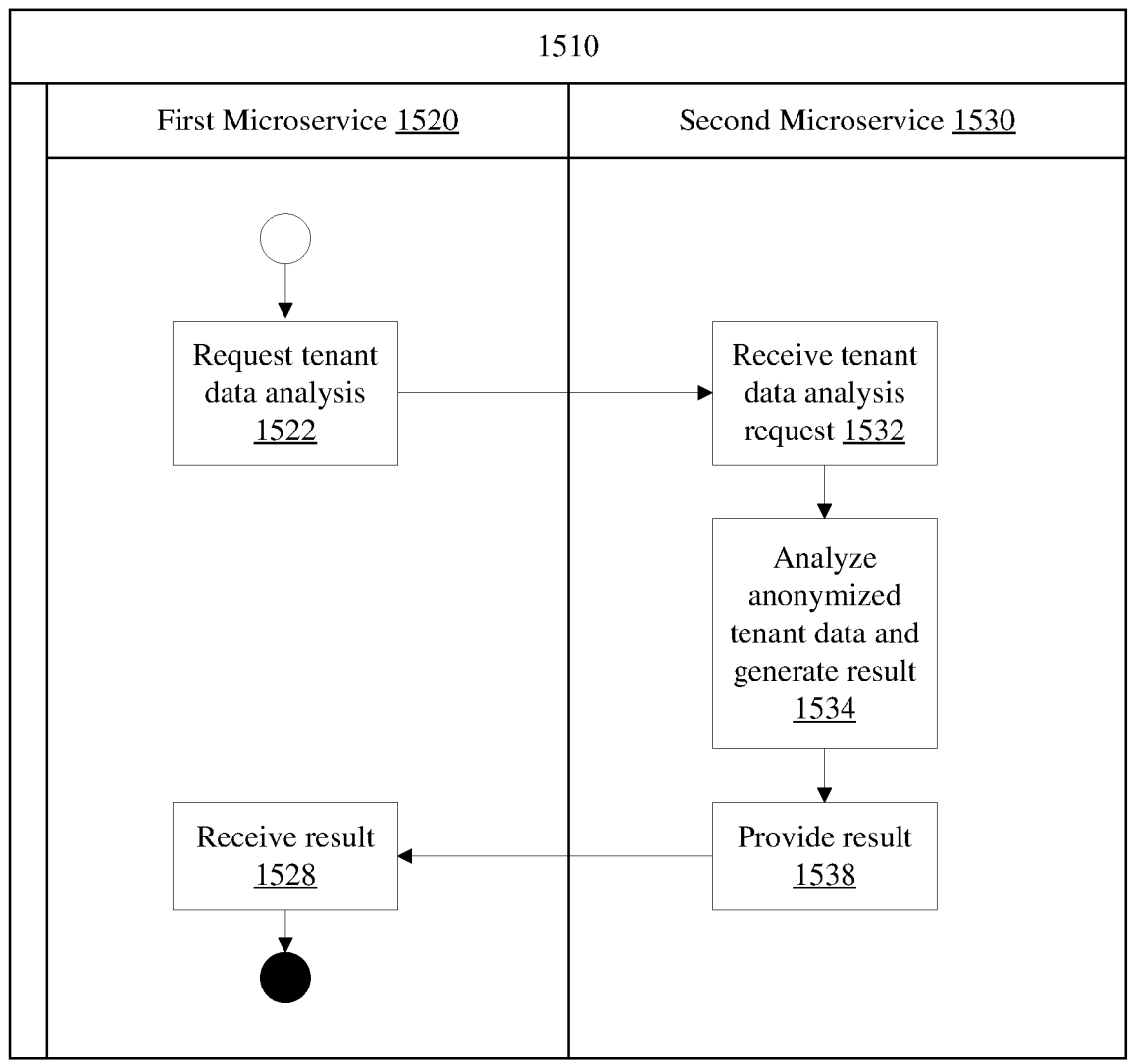
FIG. 15A is a flowchart illustrating a process for analyzing tenant data.

A process for obtaining tenant data analysis 1510 is illustrated in FIG. 15A. A first microservice 1520 requests data analysis at 1522 from a second microservice 1530. The first microservice 1520 may be a core microservice and the second microservice 1530 may be an analytics engine microservice, both as described herein. The second microservice 1530 receives the data analysis request at 1532 and then performs data analysis at 1534, generating a result. The analysis at 1534 may be performed on anonymized tenant data of a single tenant or of multiple tenants. The second microservice 1530, at 1538, provides the result or results of the analysis to the first microservice 1520. The first microservice 1520 receives the result or results at 1528.

Figure 15B:
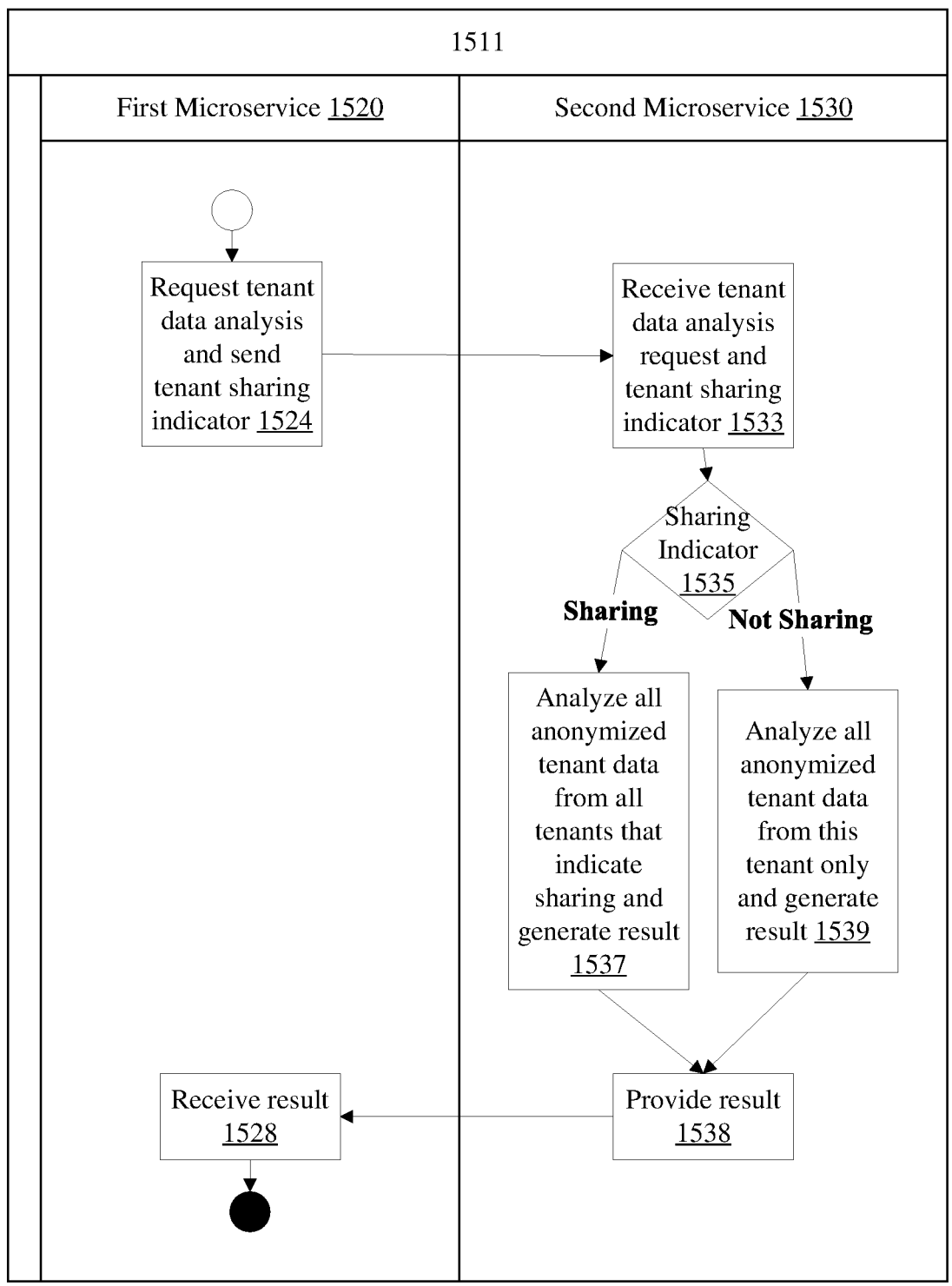
FIG. 15B is a flowchart illustrating a process for analyzing tenant data including data sharing.

Another process for obtaining data analysis 1511 is illustrated in FIG. 15B. The process 1511 is similar to the process 1510 shown in FIG. 15A, with the addition of also sending a sharing indicator at 1524 from the first microservice 1520 and receiving the sharing indicator at 1533 by the second microservice 1530. The sharing indicator may be provided along with tenant data or a request for data analysis, or it may be provided independently (or with a different request). In such a scenario, the second microservice 1520 will utilize the most recent sharing indicator provided by the requesting tenant.

The second microservice 1520 performs the requested analysis at 1535 using different sets of data based on the sharing indicator. If the sharing indicator does not indicate sharing, then the analysis is performed at 1539 using only the data of the tenant making the data analysis request. If the sharing indicator indicates that the tenant making the data analysis request shares data, then the analysis is performed at 1537 using anonymized tenant data from all tenants that also indicate sharing. Thus, this sharing analysis at 1537 uses a larger set of data because it uses the requesting tenant's data plus tenant data from other tenants' data that also share data. The results are then provided by the second microservice 1530 to the first microservice 1520 at 1538, and received by the first microservice at 1528.

In both processes 1510 and 1511, tenant data was not required to be passed to the second microservice 1530, only a request for analysis was required. The second microservice 1530 may access data previously stored by the second microservice, as in the process described in Example 17 and shown in FIG. 14. Thus, analysis may be performed on data already available to the second microservice 1530. Because the data was anonymized before being passed or stored, the data may still be analyzed while maintaining data privacy.

Example 19—Tenant Data Storage and Analysis Process

Figure 16A:
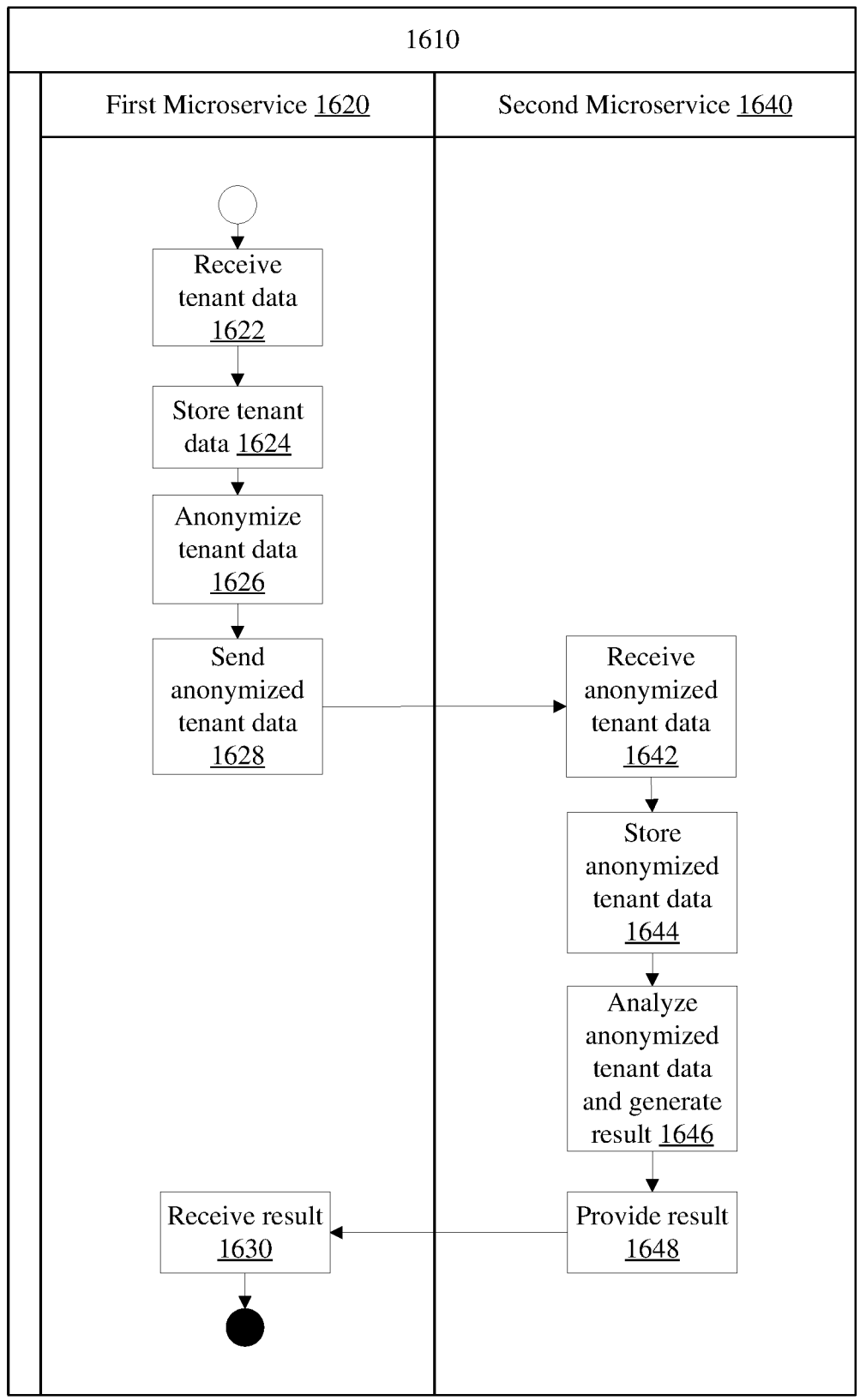
FIG. 16A is a flowchart illustrating a process for storing and analyzing tenant data.

A process for storing and analyzing data 1610 is illustrated in FIG. 16A. The process 1610 is an example combination of the processes shown in FIGS. 14 and 15A. A first microservice 1620 receives tenant data at 1622, stores the tenant data at 1624, anonymizes the tenant data at 1626 and sends the anonymized tenant data at 1628 to a second microservice 1640. The second microservice 1640 receives the anonymized tenant data at 1642 and stores the anonymized tenant data at 1644. Data analysis is then performed at 1646 by the second microservice 1640 and the results provided at 1648 to the first microservice 1620, which receives the results at 1630. A request for analysis may be sent along with the anonymized tenant data at 1628, or the data analysis may happen automatically based on the receipt of anonymized tenant data at 1642.

Figure 16B:
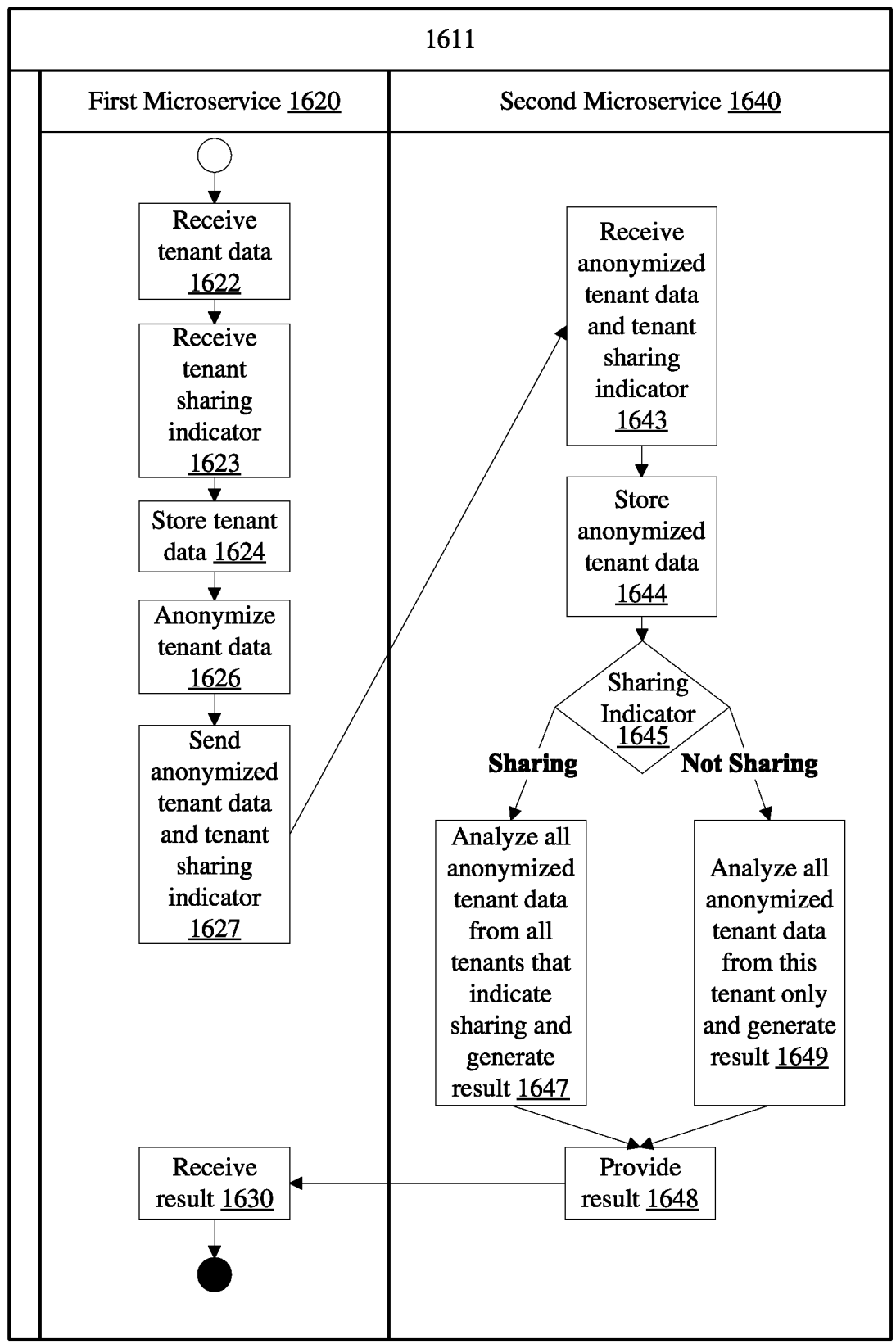
FIG. 16B is a flowchart illustrating a process for storing and analyzing tenant data including data sharing.

As illustrated in the process 1611 shown in FIG. 16B, the analysis may be performed based on a sharing indicator determined at 1645. The process 1611 is similar to the process 1610 shown in FIG. 16A. The first microservice 1620 may send anonymized tenant data and a sharing indicator at 1627 to the second microservice 1640. The second microservice 1640 receives the anonymized tenant data and the sharing indicator at 1643. The second microservice 1640 then performs the requested analysis using different sets of data based on the sharing indicator at 1645.

If the sharing indicator does not indicate sharing, then the analysis is performed at 1649 using only the data of the tenant making the data analysis request. If the sharing indicator indicates that the tenant making the data analysis request shares data, then the analysis is performed at 1647 using anonymized tenant data from all tenants that also indicate sharing. Thus, this sharing analysis 1647 uses a larger set of data because it uses the requesting tenant's data plus tenant data from other tenants' data that also share data.

The first microservice 1620 may request data analysis separately from sending anonymized tenant data at 1628; the same is true for sending anonymized tenant data and tenant sharing indicator at 1627. This is a similar separation as shown in FIGS. 15A and 15B.

Example 20—Further Example Processes

Figure 17:
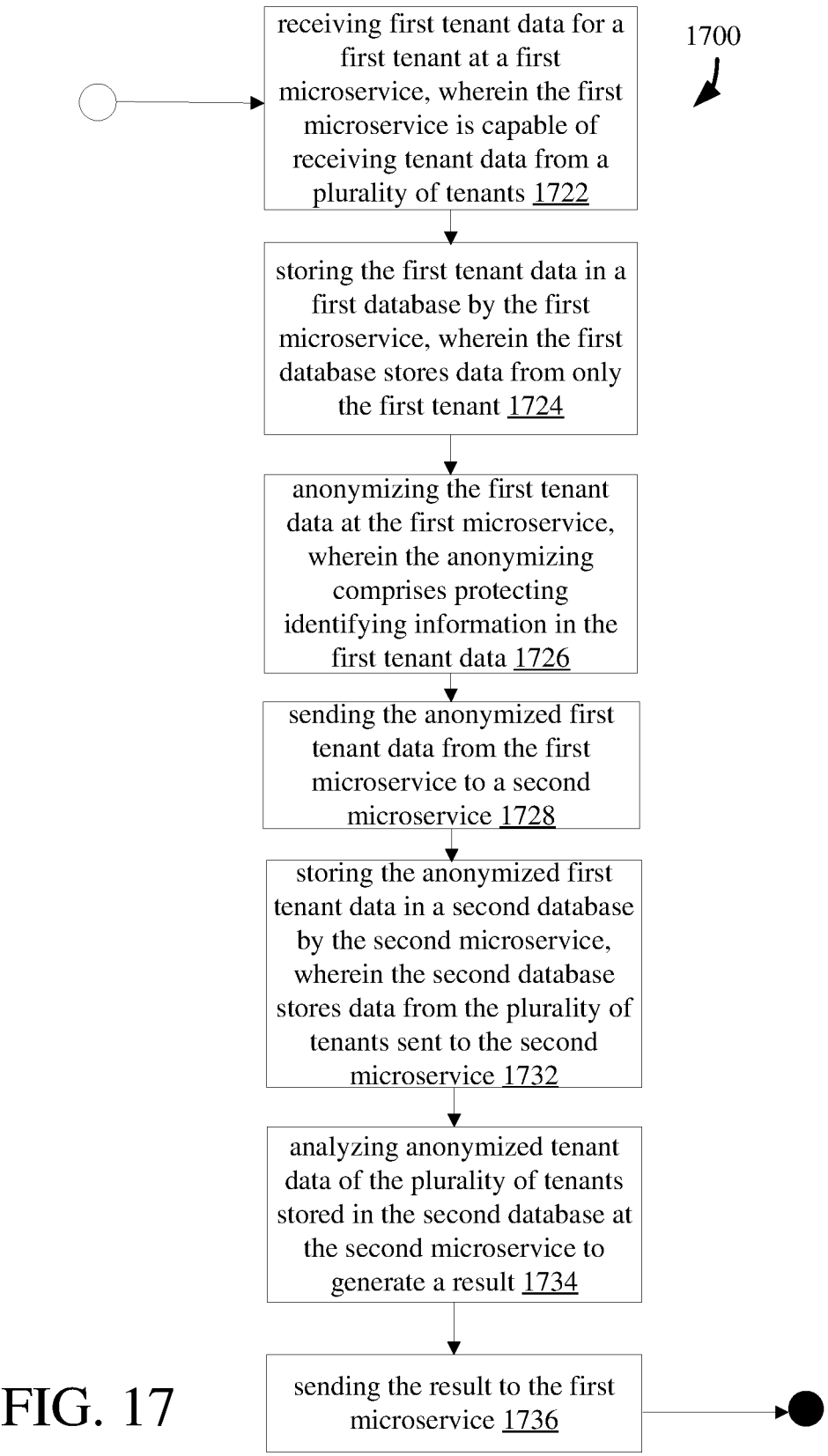
FIG. 17 is a flowchart illustrating a process for implementing disclosed technologies.

FIG. 17 illustrates a method 1700 for securely analyzing data in a multitenant microservice architecture. At 1722, a first microservice receives first tenant data for a first tenant, where the first microservice is capable of receiving tenant data from a plurality of tenants. The first microservice stores the first tenant data in a first database at 1724, where the first database stores data from only the first tenant. The first microservice anonymizes the first tenant data at 1726, which protects identifying information in the first tenant data. At 1728, the first microservice sends the anonymized first tenant data to a second microservice, which stores the anonymized first tenant data in a second database at 1732, where the second database stores data from the plurality of tenants sent to the second microservice. The second microservice analyzes anonymized tenant data of the plurality of tenants stored in the second database at 1734 to generate a result. The second microservice sends the result to the first microservice at 1736.

Figure 18:
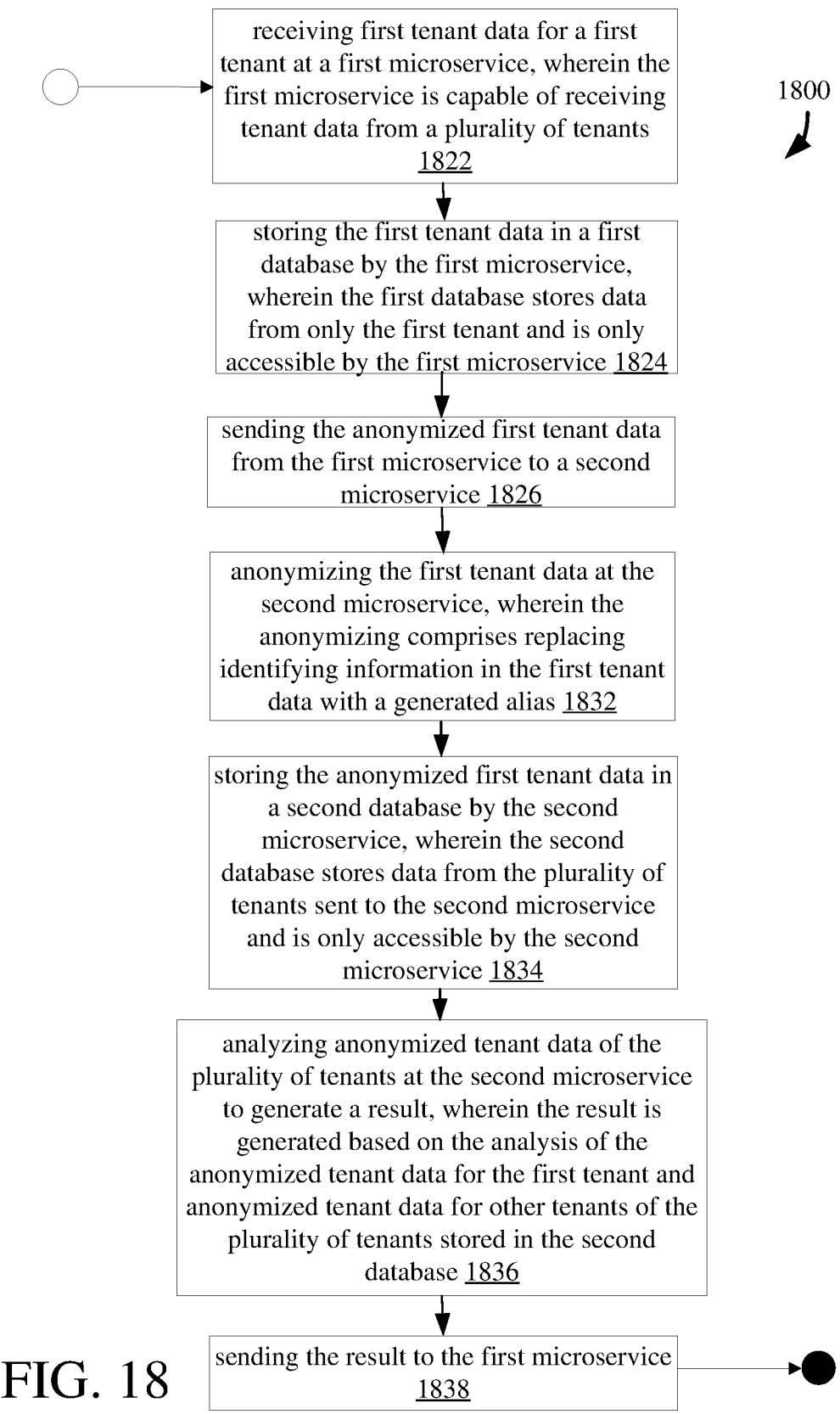
FIG. 18 is a flowchart illustrating an additional process for implementing disclosed technologies.

FIG. 18 illustrates operations 1800 for secure data analysis in a multitenant environment using a microservice architecture. At 1822, a first microservice receives first tenant data for a first tenant, where the first microservice is capable of receiving tenant data from a plurality of tenants. The first microservice stores the first tenant data in a first database at 1824, where the first database stores data only from the first tenant and is only accessible by the first microservice. The first microservice sends the first tenant data to a second microservice at 1826.

The second microservice anonymizes the first tenant data at 1832, which includes replacing identifying information in the first tenant data with a generated alias. At 1834, the second microservice stores the anonymized first tenant data in a second database, where the second database stores tenant data from the plurality of tenants sent to the second microservice and is only accessible by the second microservice. The second microservice analyzes anonymized tenant data of the plurality of tenants at 1836 to generate a result, where the result is generated based on the analysis of the anonymized tenant data for the first tenant and anonymized tenant data for other tenants of the plurality of tenants stored in the second database. The second microservice sends the result to the first microservice at 1838.

Figure 19:
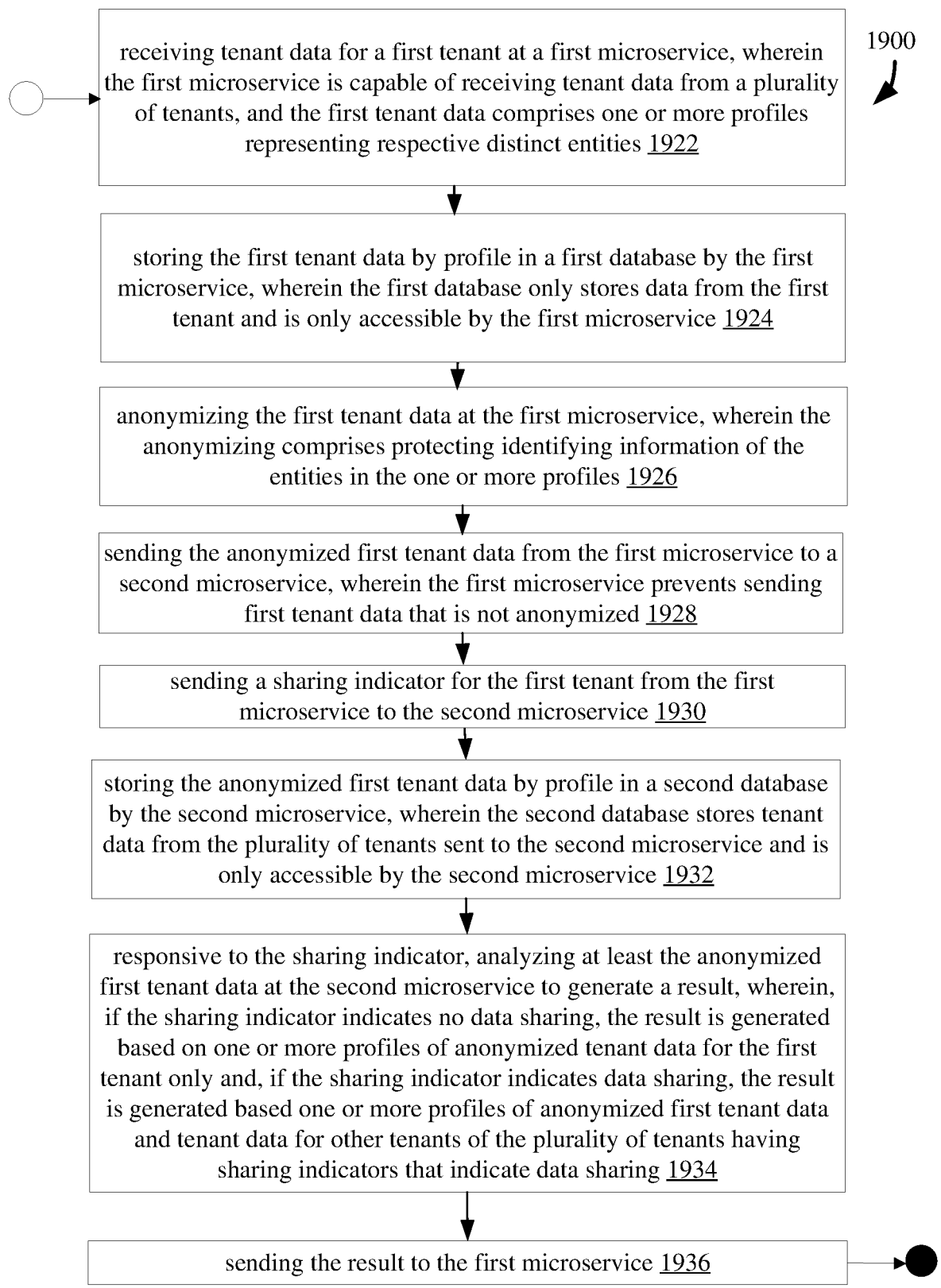
FIG. 19 is a flowchart illustrating a further additional process for implementing disclosed technologies.

FIG. 19 illustrates operations 1900 executable by a computing system for secure data analysis in a multitenant environment using a microservice architecture. A first microservice receives tenant data for a first tenant at 1922, where the first microservice is capable of receiving tenant data from a plurality of tenants, and the first tenant data comprises one or more profiles representing respective distinct entities. The first microservice stores the first tenant data by profile in a first database at 1924, where the first database only stores data from the first tenant and is only accessible by the first microservice. At 1926, the first microservice anonymizes the first tenant data, which includes protecting identifying information of the entities in the one or more profiles. The first microservice sends the anonymized first tenant data to a second microservice and prevents sending first tenant data that is not anonymized at 1928. The first microservice also sends a sharing indicator for the first tenant to the second microservice at 1930.

At 1932, the second microservice stores the anonymized first tenant data by profile in a second database, which stores tenant data from the plurality of tenants sent to the second microservice and is only accessible by the second microservice. Responsive to the sharing indicator, the second microservice analyzes at least the anonymized first tenant data to generate a result at 1934, where, if the sharing indicator indicates no data sharing, the result is generated based on one or more profiles of anonymized tenant data for the first tenant only and, if the sharing indicator indicates data sharing, the result is generated based one or more profiles of anonymized first tenant data and tenant data for other tenants of the plurality of tenants having sharing indicators that indicate data sharing. The second microservice sends the result to the first microservice at 1936.

Example 21—Example Advantages

At least certain aspects of the disclosed technologies can provide the advantage of allowing for panel data analysis using data from across multiple tenants without exposing sensitive information within that data, thus providing the technical benefit in a computing environment of provided enhanced data security. Facilitating data analysis using data of multiple tenants can provide tenants with broader access to larger amounts of data than they would normally have available, thus allowing for more accurate and useful analysis by leveraging analytical techniques from areas such as computational statistics or machine learning, while protecting sensitive data. Several specific advantages towards achieving this are highlighted.

By using an MSA to form the multitenant application from specific microservices, the microservices can be defined in a way that protects tenant data. Restricting tenant data to a core microservice can limit the points of access or potential leaks of the tenant data. Further, by removing the analytics logic from the core service and encapsulating it in the analytics engine microservice, the core microservice has no need to mix or commingle tenant data between tenants, making isolating the tenant data from other tenant data in the core microservice easier. Logic in the core microservice can function as a data silo for each tenant. Decoupling logic for analyzing the tenant data from business and persistence logic for managing the tenant data can allow for a more flexible architecture while protecting the tenant data. Composing an application using one or more microservices can facilitate security because shared tenant data is in one segregated part of the application; this part of the application, because it is a microservice, can be deployed and/or hosted separately from the rest of the application. This can allow for separate security on the deployed environment, and limits the value of the data if illegitimately obtained, making it less of a target.

Further, disclosed technologies can allow for the creation of data silos by the deployment of the microservices, in addition to isolating logic in the core microservice. Example 6 describes a deployment where each non-sharing tenant has an instance of the core microservice. This provides further data segregation, and hence increased data protection, while still allowing sharing tenants to share their data. Example 5 describes a scenario with a deployment where each tenant, whether sharing or not, has its own instance of the core microservice, providing a complete data silo for each tenant within the application.

By partitioning the application logic into microservices, attacks on the application are likely to be less successful. Access on one microservice will not provide access to others, making the system as a whole (and the data within it) less susceptible to attack, and hence to losing sensitive data. As the multitenant application appears as a single application from the outside, but is in fact composed of multiple independent microservices, the application is less susceptible to attack. The system security for each microservice can also be uniquely implemented and configured, distinct from the other microservices, which adds another layer of protection and flexibility.

The anonymization of tenant data can provide a valuable layer of protection in addition to the architecture design. Anonymizing tenant data before passing it from the core microservice to the analytics engine microservice can help ensure that any data that is accessed or leaks outside the core microservice is not attributable to specific entities, such as individual people or organizations. It also can help ensure that data analytics performed on the anonymized data does not reveal sensitive information (because it is not available), yet the analysis can still be accurately performed because the data within each profile can still be accurately attributed to that profile. In the case of security breaches or software malfunctions, the data that can potentially leak from the analytics engine microservice is less likely to be tracked back to a specific individual. Data anonymization provides the advantage of allowing the analytics engine to utilize tenant data from multiple tenants, which can encourage tenants to participate in data sharing. This enlarged data pool can then provide a large amount of data useful for more effective analysis—tenants benefit from the collective knowledge of all their tenant data together.

The disclosed architecture coupled with data anonymization encourages the use of multitenant applications in the cloud by reducing or eliminating the risks of sharing tenant data. This produces better analytical results while reducing costs of the application for each tenant.

Example 22—Detailed Application Embodiment

In a specific example, the disclosed technologies can be used to implement a human capital management application (HCM), such as being incorporated into the People Insights application of SAP SE of Walldorf, Germany, which can use S4/HANA, also of SAP SE. The HCM is a multitenant application that may have a plurality of customers. Each customer of the HCM is typically a business with a plurality of employees. Each employee of the customer has a profile in the HCM.

The HCM continuously collects data about the needs of each employee, including the employee's satisfaction with respect to each need and actions taken to address each employees' needs, and maintains the data and the changes in the data over time. In this way, the HCM maintains an employee profile that includes panel data about the employee. By analyzing available employee profiles, the HCM may recommend actions that may improve satisfaction of an employee. This analysis considers the data evolving through time, hence, the HCM performs panel data analysis. Because the HCM may analyze data from several customers, it can be useful to decouple the analyzed data from the employee identifier to allow more customers to use a broader set of employee data than only their own employee profiles.

To accomplish secure panel data analysis amongst multiple tenants, the HCM is formed from several microservices: a user interface microservice, a core microservice, and an analytics engine microservice. This is similar to the architectures shown in FIGS. 4, 5, and 6. The user interface microservice runs in a browser and may be hosted on the client side or be a web application accessed remotely, such as shown in FIG. 13. A user of the customer, such as a human resources manager, accesses the HCM through the user interface microservice. Further, employee data is entered through the user interface microservice. A batch interface may be made available as well for loading a large number of employee profiles. Employees may be able to access their profiles and so provide data through the user interface microservice.

The responsibilities of the HCM core microservice (also called the core service) is to collect, maintain, and provide information for display, to the user interface microservices, about employees; similarly to the core microservice described in Example 7 and shown in FIGS. 7, 8, and 9. Collecting and maintaining information includes providing functionality for employee profile management and persisting employee information in a database dedicated to the customer for whom the employee works. Further, the core service isolates the employee profiles to just their applicable employer (the customer of the HCM) and prevents this information from being mixed with employee profiles of other customers. This includes presenting to a user or employee, through the user interface microservices, the recommended actions based on the current employee profile.

To reduce the response time of the HCM, the core service caches information enabling action recommendation. In particular, the core service stores locally an aggregate that specifies the usefulness of an action for a given need. This aggregate is computed by a recommendation service and is read and made available to the core service. Importantly, the core service anonymizes employee profiles by generating a stable alias for each profile prior to providing them to the recommendation service, thus further protecting the employee profiles.

The HCM analyzes the panel data in the employee profiles and recommends actions to take to increase the employee's satisfaction. The recommendation logic is encapsulated in the analytics engine microservice, which is also called the recommendation service; this is similar to the analytics engine microservice described in Example 8, and shown in FIGS. 7, 8, and 9. The responsibility of the recommendation service is to forecast how useful an action is for a particular need, for a particular employee or across all similar employees. To provide such a forecast the recommendation service analyzes existing employee profiles and actions associated with the change of the employee satisfaction.

The recommendation service accumulates statistical data about employee profile changes and associated actions from the core service and delivers results of the analysis back to the core service. The analysis may include the use of dynamic rules; these rules may be used in either determining actual results or in determining the methodology used to generate results. The dynamic rules may be configurable, such as to set or update a threshold or to activate or deactivate a particular rule or set of rules. In some instances, it may be possible for a user to create or delete a rule. Because the recommendation service proposes an action in response to an employee need, the results returned may be in the form of an action-need tuple, or a matrix of action-need tuples. When selecting an action to propose, the recommendation service may utilize AB testing to eliminate bias in the final results proposed.

In some scenarios, the recommendation service may require authorization or authentication before responding to a request from the core service. This may involve tenant or user credentials, technical credentials, application credentials, or core microservice credentials. The recommendation service may authenticate the sender of a request before acting on the request, either performing the authentication itself, using an outside application to verify the credentials, or using a third party authentication or identification service. Once the request is authenticated, the recommendation service will proceed; if the request is not authenticated, it will not proceed. Further, the recommendation service exposes no interface for accessing profiles or tenant data stored in its database, thus further protecting the employee profile data. In this way, the recommendation service only provides access to analytical results.

The responsibilities of the core service and the recommendation service are different. Forming the HCM from multiple microservices can allow each microservice to be designed and deployed independently. Thus, the architecture of each microservice can be more precisely shaped towards its responsibilities. Furthermore, the internal architecture of each microservice can be changed in a more flexible way. Each microservice can be maintained separately, and updates made, tested and deployed independently, which allows for faster and more efficient updates. This architecture design also protects the sensitive information in the data used for analysis, by segregating the recommendation logic from the rest of the application, allowing the recommendation logic access only to the data available to the recommendation service, which is only anonymized profiles.

The first time the system is used, action proposals made by the recommendation service can be based on a fallback influence matrix, which contains default results. After a specified time, the generated results will be evaluated by the data quality analyzer. If a result, such as action-need tuple, is evaluated as 'good,' the cell for that result in the fallback influence matrix will be updated by the value given by the recommendation logic, such as a machine learning model. A result may qualify as good based on a threshold or a statistical analysis. If the quality of a result is not good enough, the value of the fallback influence matrix remains the same. Each time the data quality analyzer is invoked, results can be checked for quality and only those cells that correspond to quality results will be updated.

Example 23—Detailed Microservice Interface Embodiment

Although the recommendation service does not expose an API and is not generally or publicly accessible because it is a microservice, it does have an interface for communicating with the core service. In one embodiment, the microservices are RESTful (implemented pursuant to REST). The following table is an example of an interface definition for the recommendation service, based on resources made available by the recommendation service. These resources indicate the location (URI) of providing data to the recommendation service for the requests (functionality) described.

| Resource Name | Path | Supported Methods | Tenant Specific |
|---|---|---|---|
| Tenants | /tenants/ | POST, PATCH | No |
| Answers | /answers/ | PATCH | Yes |
| InfluenceValues | /influenceValues/ | POST, GET | Yes |

The functionality of the Tenants resource may further be defined, at least in part, as follows:

| Method Name | Related Use Case | Path | Request Headers | Request Content | Success Response Status | Success Response Body |
|---|---|---|---|---|---|---|
| POST | Use Case 1: Add tenant | /tenants/ | Content type: application/JSON | { "name": "tenantName", "sharing" : true } | 201 CREATED | { "name": "tenantName", "sharing" : true } |

| Method Name | Related Use Case | Path | Request Headers | Request Content | Success Response Status | Success Response Body |
|---|---|---|---|---|---|---|
| PATCH | Use Case 2: Change Tenant Sharing Mode | /tenants/ | Content type: apphcation/JSON | { "name": "tenantName", "sharing" : true } | 200 OK | { "name": "tenantName", "sharing" : true } |

Request Content:

| Attribute Name | Attribute type | Attribute Description | Properties |
|---|---|---|---|
| name | String | tenant name | not null |
| sharing | Boolean | tenant sharing mode | |

The functionality of the Answers resource may further be defined, at least in part, as follows:

| Method Name | Related Use Case | Path | Request Headers | Request Content | Success Response Status | Success Response Body |
|---|---|---|---|---|---|---|
| PATCH | Use Case 3: Add Employee Profiles | /answers/?tenantId=<tenant Name> | Content type: application/JSON | [ { "employeeAlias": "alias", "employeeBirthYear": 1990, "createdAt": "XXXXX" "answers": [{ "questionId": "q1", "satisfaction": 1, "important": true, "actionTypeIds": ["a1", ...] } ], ... }, ... ] | 201 CREATED | |

Request Content for EmployeeAnswer:

| Attribute Name | Attribute type | Attribute Description | Properties |
|---|---|---|---|
| employeeAlias | String | the alias of the employee | not null |
| employeeBirthyear | Integer | example metadata of an employee | |
| createdAt | Instant | timestamp of saved answer | not null |
| answers | Array of Answer | answers | not null |

Request Content for Answer:

| Attribute Name | Attribute type | Attribute Description | Properties |
|---|---|---|---|
| questionId | String | the alias of the employee | not null |
| important | Boolean | the importance of the question | |
| createdAt | Instant | timestamp of saved answer | |
| satisfaction | Integer | the current satisfaction of the question (need) | not null |
| actionTypeIds | Array of String | the answers to the question | |

The functionality of the InfluenceValues resource may further be defined, at least in part, as follows:

| Method Name | Related Use Case | Path | Request Headers | Request Content | Success Response Status | Success Response Body |
|---|---|---|---|---|---|---|
| POST | Use Case 4: Calculate Recommendation Aggregate | /influenceValues/?tenantId=<tenant Name> | Content type: application/JSON | | 201 CREATED | |

| Method Name | Related Use Case | Path | Request Headers | Request Content | Success Response Status | Success Response Body |
|---|---|---|---|---|---|---|
| GET | Use Case 5: Read Recommendation Aggregate | /influenceValues/?tenantId=<tenant Name> | Content type: application/JSON | | 200 OK | [{ "questionId": "q1", "actionTypeId": "a1", "value": 1.5 }] |

Request Content of InfluenceValue:

| Attribute Name | Attribute type | Attribute Description | Properties |
|---|---|---|---|
| questionId | String | the question type | not null |
| value | Double | the influence value | not null |
| actionTypeId | String | the action type | not null |

Example 24—Computing Systems

Figure 20:
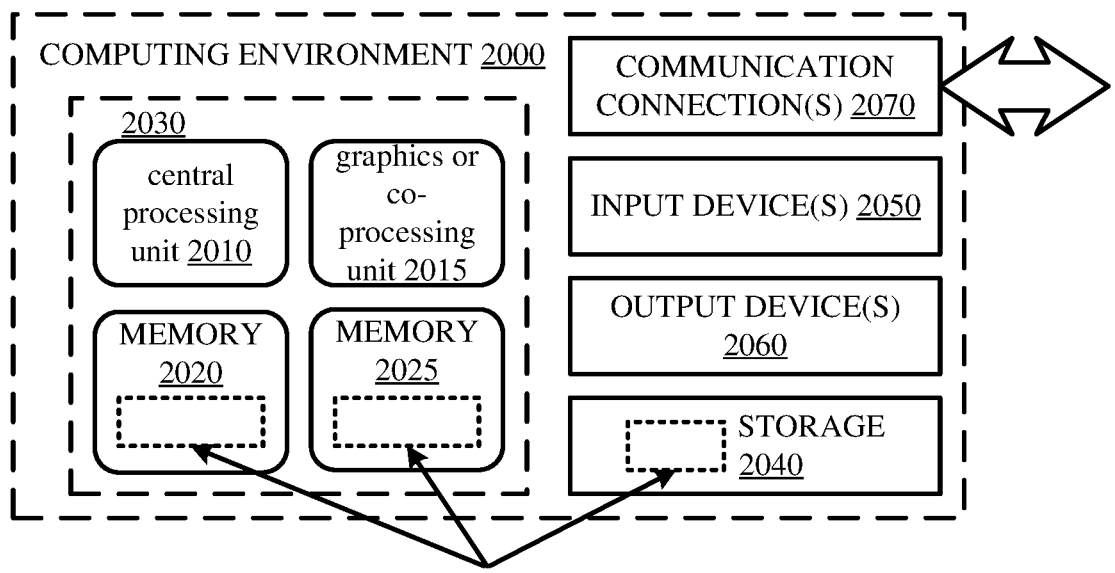
FIG. 20 is a diagram of an example computing system in which described embodiments can be implemented.

FIG. 20 depicts a generalized example of a suitable computing system 2000 in which the described innovations may be implemented. The computing system 2000 is not intended to suggest any limitation as to scope of use or functionality of the present disclosure, as the innovations may be implemented in diverse general-purpose or special-purpose computing systems.

With reference to FIG. 20, the computing system 2000 includes one or more processing units 2010, 2015 and memory 2020, 2025. In FIG. 20, this basic configuration 2030 is included within a dashed line. The processing units 2010, 2015 execute computer-executable instructions, such as for implementing components of the processes of 1410, 1510, or 1610, or the architecture 400 of FIG. 4, including the core microservice 0430, the analytics engine microservice 0440, etc. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 20 shows a central processing unit 2010 as well as a graphics processing unit or co-processing unit 2015. The tangible memory 2020, 2025 may be volatile memory (e.g., registers, cache, RAM), non-volatile memory (e.g., ROM, EEPROM, flash memory, etc.), or some combination of the two, accessible by the processing unit(s) 2010, 2015. The memory 2020, 2025 stores software 2080 implementing one or more innovations described herein, in the form of computer-executable instructions suitable for execution by the processing unit(s) 2010, 2015. The memory 2020, 2025, may also store database data, such as data associated with the tenant databases 0433 through 0436 or the analytics engine database 0443 as shown in FIG. 4.

A computing system 2000 may have additional features. For example, the computing system 2000 includes storage 2040, one or more input devices 2050, one or more output devices 2060, and one or more communication connections 2070. An interconnection mechanism (not shown) such as a bus, controller, or network interconnects the components of the computing system 2000. Typically, operating system software (not shown) provides an operating environment for other software executing in the computing system 2000, and coordinates activities of the components of the computing system 2000.

The tangible storage 2040 may be removable or non-removable, and includes magnetic disks, magnetic tapes or cassettes, CD-ROMs, DVDs, or any other medium which can be used to store information in a non-transitory way and which can be accessed within the computing system 2000. The storage 2040 stores instructions for the software 2080 implementing one or more innovations described herein.

The input device(s) 2050 may be a touch input device such as a keyboard, mouse, pen, or trackball, a voice input device, a scanning device, or another device that provides input to the computing system 2000. The output device(s) 2060 may be a display, printer, speaker, CD-writer, or another device that provides output from the computing system 2000.

The communication connection(s) 2070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality.

Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program. For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 25—Cloud Computing Environment

Figure 21:
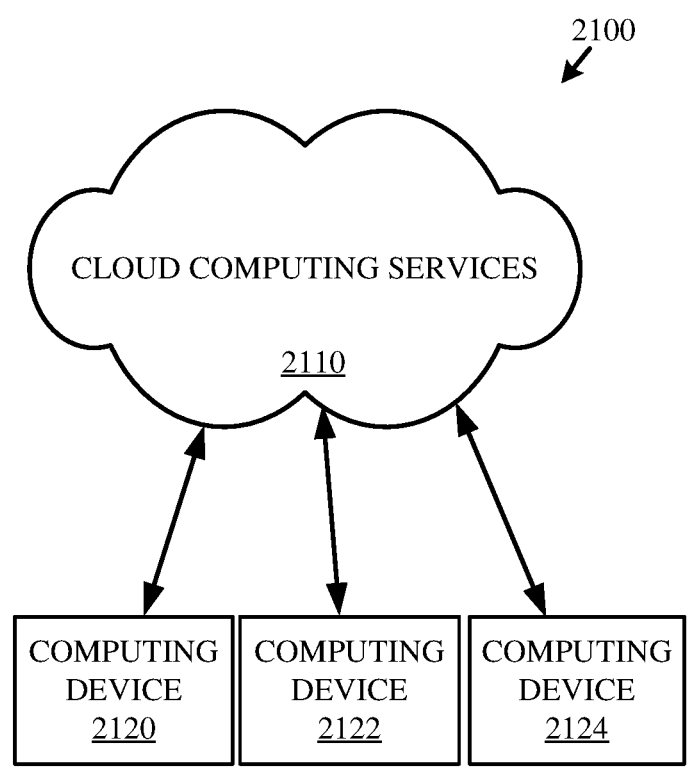
FIG. 21 is an example cloud computing environment that can be used in conjunction with the technologies described herein.

FIG. 21 depicts an example cloud computing environment 2100 in which the described technologies can be implemented. The cloud computing environment 2100 comprises cloud computing services 2110. The cloud computing services 2110 can comprise various types of cloud computing resources, such as computer servers, data storage repositories, networking resources, etc. The cloud computing services 2110 can be centrally located (e.g., provided by a data center of a business or organization) or distributed (e.g., provided by various computing resources located at different locations, such as different data centers and/or located in different cities or countries).

The cloud computing services 2110 are utilized by various types of computing devices (e.g., client computing devices), such as computing devices 2120, 2122, and 2124. For example, the computing devices (e.g., 2120, 2122, and 2124) can be computers (e.g., desktop or laptop computers), mobile devices (e.g., tablet computers or smart phones), or other types of computing devices. For example, the computing devices (e.g., 2120, 2122, and 2124) can utilize the cloud computing services 2110 to perform computing operations (e.g., data processing, data storage, and the like).

Example 26—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 20, computer-readable storage media include memory 2020 and 2025, and storage 2040. The term computer-readable storage media does not include signals and carrier waves. In addition, the term computer-readable storage media does not include communication connections (e.g., 2070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method comprising:

receiving, at a first microservice, non-anonymized first tenant data for a first tenant of a multitenant database system;

storing, by the first microservice, the non-anonymized first tenant data in at least a portion of a first database defined for the first tenant, at least a portion of the first tenant data being stored as instances of a first entity comprising a plurality of attributes, at least one attribute of the plurality of attributes for the first entity being designated for anonymization but not being anonymized in the non-anonymized first tenant data;

receiving, by a second microservice from the first microservice, an analysis request from a client, the analysis request being associated with a first tenant identifier identifying the first tenant;

receiving, from the second microservice by the first microservice, non-anonymized second tenant data for a second tenant of the multitenant database system, the second tenant being different than the first tenant;

in response to the analysis request, the second microservice:

storing the non-anonymized second tenant data in at least a portion of a second database defined for the second tenant, wherein the second database is the first database or is a database different than the first database, and wherein the non-anonymized first tenant data and the non-anonymized second data are logically separated such that the first tenant cannot access the non-anonymized second tenant data and the second tenant cannot access the non-anonymized first tenant data;

anonymizing at least a portion of the non-anonymized first tenant data to provide anonymized first tenant data wherein the anonymizing comprises protecting identifying information in the non-anonymized first tenant data by replacing values of the at least one attribute with an alias, the protecting comprising: generating a random alias for identifying information in the first tenant data; storing the random alias associated with the first tenant data in the first database; replacing the identifying information with the random alias in the anonymized first tenant data; and preventing sending of non-anonymized first tenant data to a third database;

storing the anonymized first tenant data in at least a portion of the third database, the third database defined to store data for the first tenant and the second tenant, where the third database can be the first database or the second database, provided that the anonymized first tenant data is logically separated from any non-anonymized tenant data for the at least one attribute;

anonymizing at least a portion of the non-anonymized second tenant data to provide anonymized second tenant data, wherein the anonymizing comprises protecting identifying information in the second tenant data by replacing values of the at least one attribute with an alias;

storing the anonymized second tenant data in the third database, wherein the anonymized first tenant data and the anonymized second tenant data are collectively made available for analysis requests associated with the first tenant or associated with the second tenant;

aggregating the anonymized first tenant data and the anonymized second tenant data stored in the third database to provide aggregated, anonymized tenant data;

in response to the analysis request, analyzing the aggregated, anonymized tenant data to generate a first result; and sending a second result to the client in response to the analysis request, wherein the second result is based at least in part on the first result, the second result indicating a recommendation based on the aggregated, anonymized tenant data.

2. The method of claim 1, wherein anonymizing at least a portion of the non-anonymized first tenant data further comprises maintaining a correlation between the anonymized first tenant data and the first tenant, such that the anonymized first tenant data can still be identified as being first tenant data.

3. The method of claim 1, wherein the second result comprises non-anonymized first tenant data.

4. The method of claim 1, wherein the first result comprises an identifier for associating the first result with non-anonymized first tenant data.

5. The method of claim 1, wherein the anonymizing at least a portion of the non-anonymized first tenant data and the aggregating the anonymized first tenant data and the anonymized second tenant data are carried out by different, separate microservices.

6. One or more non-transitory computer-readable storage media storing computer-executable instructions for causing a computing system to perform operations comprising:

receiving, at a first microservice, non-anonymized first tenant data for a first tenant of a multitenant database system;

storing, at a first microservice, the non-anonymized first tenant data in at least a portion of a first database defined for the first tenant, at least a portion of the non-anonymized first tenant data being stored as instances of a first entity comprising a plurality of attributes, at least one attribute of the plurality of attributes for the first entity being designated for anonymization but not being anonymized in the non-anonymized first tenant data;

receiving, by a second microservice from the first microservice, an analysis request from a client, the analysis request being associated with a first tenant identifier identifying the first tenant;

receiving, from the second microservice by the first microservice, non-anonymized second tenant data for a second tenant of the multitenant database system, the second tenant being different than the first tenant;

in response to the analysis request, the second microservice:

storing the non-anonymized second tenant data in at least a portion of a second database defined for the second tenant, wherein the second database is the first database or is a database different than the first database, and wherein the non-anonymized first tenant data and the nonanonymized second data are logically separated such that the first tenant cannot access the nonanonymized second tenant data and the second tenant cannot access the non-anonymized first tenant data;

anonymizing the non-anonymized first tenant data, wherein the anonymizing comprises replacing values of the at least one attribute with a generated alias;

storing the anonymized first tenant data in at least a portion of a third database defined to store data for the first tenant and the second tenant, where the third database can be the first database or the second database, provided that the anonymized first tenant data is logically separated from any non-anonymized tenant data for the at least one attribute;

anonymizing the non-anonymized second tenant data to provide anonymized second tenant data, wherein the anonymizing comprises protecting identifying information in the nonanonymized second tenant data by replacing values of the at least one attribute with an alias, the protecting comprising: generating a random alias for identifying information in the first tenant data; storing the random alias associated with the first tenant data in the first database; replacing the identifying information with the random alias in the anonymized first tenant data; and preventing sending of non-anonymized first tenant data to the third database;

storing the anonymized second tenant data in the third database, wherein the anonymized first tenant data and the anonymized second tenant data are collectively made available for analysis requests associated with the first tenant or associated with the second tenant;

aggregating the anonymized first tenant data and the anonymized second tenant data stored in the third database to provide aggregated, anonymized tenant data;

in response to the analysis request, analyzing the aggregated, anonymized tenant to generate a first result; and sending a second result to the client in response to the analysis request, wherein the second result is based at least in part on the first result, the second result indicating a recommendation based on the aggregated, anonymized tenant data.

7. The one or more non-transitory computer-readable storage media of claim 6, wherein anonymizing at least a portion of the non-anonymized first tenant data comprises maintaining a correlation between the anonymized first tenant data and the first tenant, such that the anonymized first tenant data can still be identified as coming from the first tenant.

8. The one or more non-transitory computer-readable storage media of claim 6, wherein the second result comprises non-anonymized first tenant data.

9. The one or more non-transitory computer-readable storage media of claim 6, wherein the first result comprises an identifier for associating the first result with nonanonymized first tenant data.

10. The one or more non-transitory computer-readable storage media of claim 6, wherein the anonymizing at least a portion of the non-anonymized first tenant data and the aggregating the anonymized first tenant data and the anonymized second tenant data are carried out by different, separate microservices.

11. A computing system comprising:
one or more memories;
one or more processing units coupled to the one or more memories; and
one or more computer readable storage media storing instructions that, when loaded into the one or more memories, cause the one or more processing units to perform operations comprising:

receiving, at a first microservice, non-anonymized first tenant data for a first tenant of a multitenant database system, the non-anonymized first tenant data comprising one or more profiles representing respective distinct entities;

storing, by the first microservice, the non-anonymized first tenant data in at least a portion of a first database defined for the first tenant, at least a portion of the non-anonymized first tenant data being stored as instances of a first entity comprising a plurality of attributes, at least one attribute of the plurality of attributes for the first entity being designated for anonymization but not being anonymized in the non-anonymized first tenant data;

receiving, by a second microservice from the first microservice, an analysis request from a client, the analysis request being associated with a first tenant identifier identifying the first tenant;

receiving, from the second microservice by the first microservice, non-anonymized second tenant data for a second tenant of the multitenant database system, the second tenant being different than the first tenant;

in response to the analysis request, the second microservice:
storing the non-anonymized second tenant data in at least a portion of a second database defined for the second tenant, wherein the second database is the first database or is a database different than the first database, and wherein the non-anonymized first tenant data and the non-anonymized second tenant data are logically separated such that the first tenant cannot access the non-anonymized second tenant data and the second tenant cannot access the nonanonymized first tenant data;

anonymizing at least a portion of the non-anonymized first tenant data to provide anonymized first tenant data, wherein the anonymizing comprises protecting identifying information of the entities in the one or more profiles by replacing values of the at least one attribute with an alias, the protecting comprising: generating a random alias for identifying information in the first tenant data; storing the random alias associated with the first tenant data in the first database; replacing the identifying information with the random alias in the anonymized first tenant data; and preventing sending of non-anonymized first tenant data to a third database;

sending a sharing indicator for the first tenant to the third database;

storing the anonymized first tenant data by profile in at least a portion of the third database, the third database defined to store data for the first tenant and the second tenant, where the third database can be the first database or the second database, provided that the anonymized first tenant data is logically separated from any nonanonymized tenant data for the at least one attribute;

anonymizing the non-anonymized second tenant data to provide anonymized second tenant data, wherein the anonymizing comprises protecting identifying information in the non-anonymized second tenant data by replacing values of the at least one attribute with an alias;

storing the anonymized second tenant data in the third database, wherein the anonymized first tenant data and the anonymized second tenant data are collectively made available for analysis requests associated with the first tenant or associated with the second tenant;

aggregating the anonymized first tenant data and the anonymized second tenant data stored in the third database to provide aggregated, anonymized tenant data;

responsive to the analysis request, and the sharing indicator, analyzing at least the anonymized first tenant data to generate a first result, wherein, if the sharing indicator indicates no data sharing, the first result is generated based on one or more profiles of anonymized tenant data for the first tenant only and, if the sharing indicator indicates data sharing, the first result is generated based on aggregated profile data comprising one or more profiles of anonymized first tenant data and tenant data for other tenants of the plurality of tenants having sharing indicators that indicate data sharing; and sending a second result to the client in response to the analysis request, the second result being based at least in part on the first result, the second result indicating a recommendation based on the aggregated, anonymized tenant data.

12. The system of claim 11, wherein anonymizing at least a portion of the non-anonymized first tenant data further comprises maintaining a correlation between the anonymized first tenant data and the first tenant, such that the anonymized first tenant data can still be identified as coming from the first tenant.

13. The system of claim 11, wherein the result is generated based on a subset of anonymized tenant data available in the third database, the subset being associated with tenants with a sharing indicator indicating data sharing.

14. The system of claim 11, wherein the second result comprises nonanonymized first tenant data.

15. The system of claim 11, wherein the first result comprises an identifier for associating the first result with non-anonymized first tenant data.

16. The system of claim 11, wherein the anonymizing at least a portion of the non-anonymized first tenant data and the aggregating the anonymized first tenant data and the anonymized second tenant data are carried out by different, separate microservices.

* * * * *